(12) United States Patent
Komatsu et al.

(10) Patent No.: US 6,772,410 B1
(45) Date of Patent: Aug. 3, 2004

(54) PROGRAM VERIFYING SYSTEM, PROGRAM VERIFYING METHOD, AND STORAGE MEDIUM FOR STORING SOFTWARE OF PROGRAM VERIFYING METHOD

(75) Inventors: Chihiro Komatsu, Tokyo (JP); Satoru Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/482,096

(22) Filed: Jan. 13, 2000

(30) Foreign Application Priority Data

Jan. 14, 1999 (JP) .......................................... 11-007919

(51) Int. Cl.[7] .............................................. G06F 9/44
(52) U.S. Cl. ................................................... 717/124
(58) Field of Search .............................. 717/124–127, 717/151–154; 714/37–39, 47

(56) References Cited

U.S. PATENT DOCUMENTS

| 5,748,964 A | | 5/1998 | Gosling ....................... 717/126 |
| 5,999,731 A | * | 12/1999 | Yellin et al. ................. 717/126 |
| 6,067,575 A | * | 5/2000 | McManis et al. ........... 709/313 |
| 6,075,940 A | * | 6/2000 | Gosling ....................... 717/126 |
| 6,477,702 B1 | * | 11/2002 | Yellin et al. ................. 717/126 |

FOREIGN PATENT DOCUMENTS

| JP | 5-143301 | 6/1993 |
| JP | 6-509892 | 11/1994 |
| JP | 8-234994 | 9/1996 |
| WO | WO 93/03448 | 2/1993 |

OTHER PUBLICATIONS

Geoghegan et al. Design, Verification, and Validation of Self–Checking Software Components. IEEE. 1996. pp. 420–426.*

Hemer et al. The CARE Toolset for Developing Verified Programs from Formal Specification. IEEE. 1996. pp. 24–35.*

Richardson. Automating Changes of Data Type in Functional Programs. IEEE. pp. 166–173.*

* cited by examiner

*Primary Examiner*—Wei Zhen
(74) *Attorney, Agent, or Firm*—Sughrue Mion, PLLC

(57) ABSTRACT

A storage area managing system using a system for virtually executing a program code before really executing the program code, the storage area managing system, that comprises virtual executing means for verifying only a data type restriction of the program code before really executing the program code, data valid range deciding means for deciding the final use position of each data and storing it during the process of said virtual executing means, and storage area unallocating means for unallocating a storage area for data that exceeds the data valid range corresponding to the data validity range information designated by said data valid range deciding means during the real execution of the program code.

21 Claims, 29 Drawing Sheets

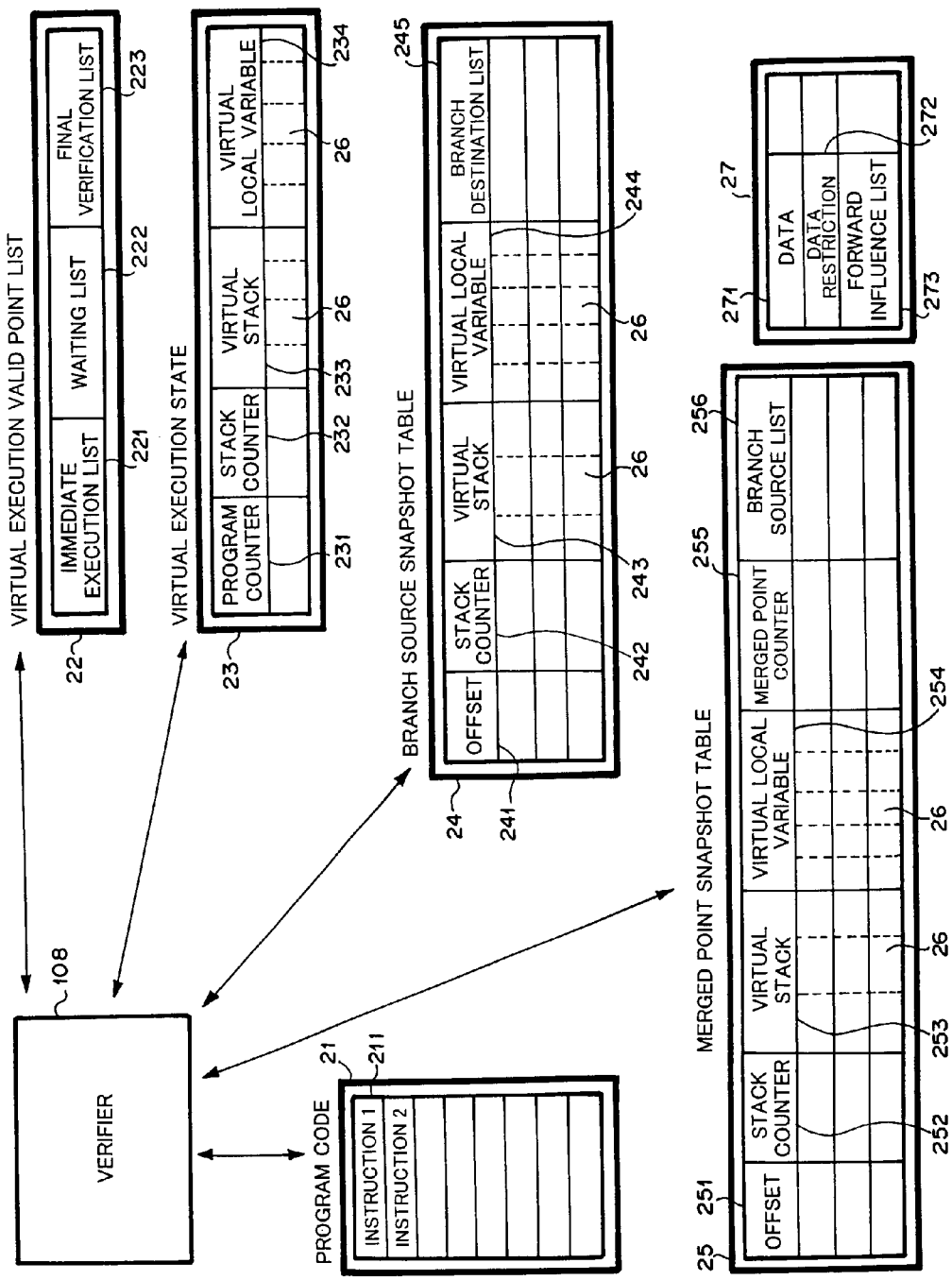

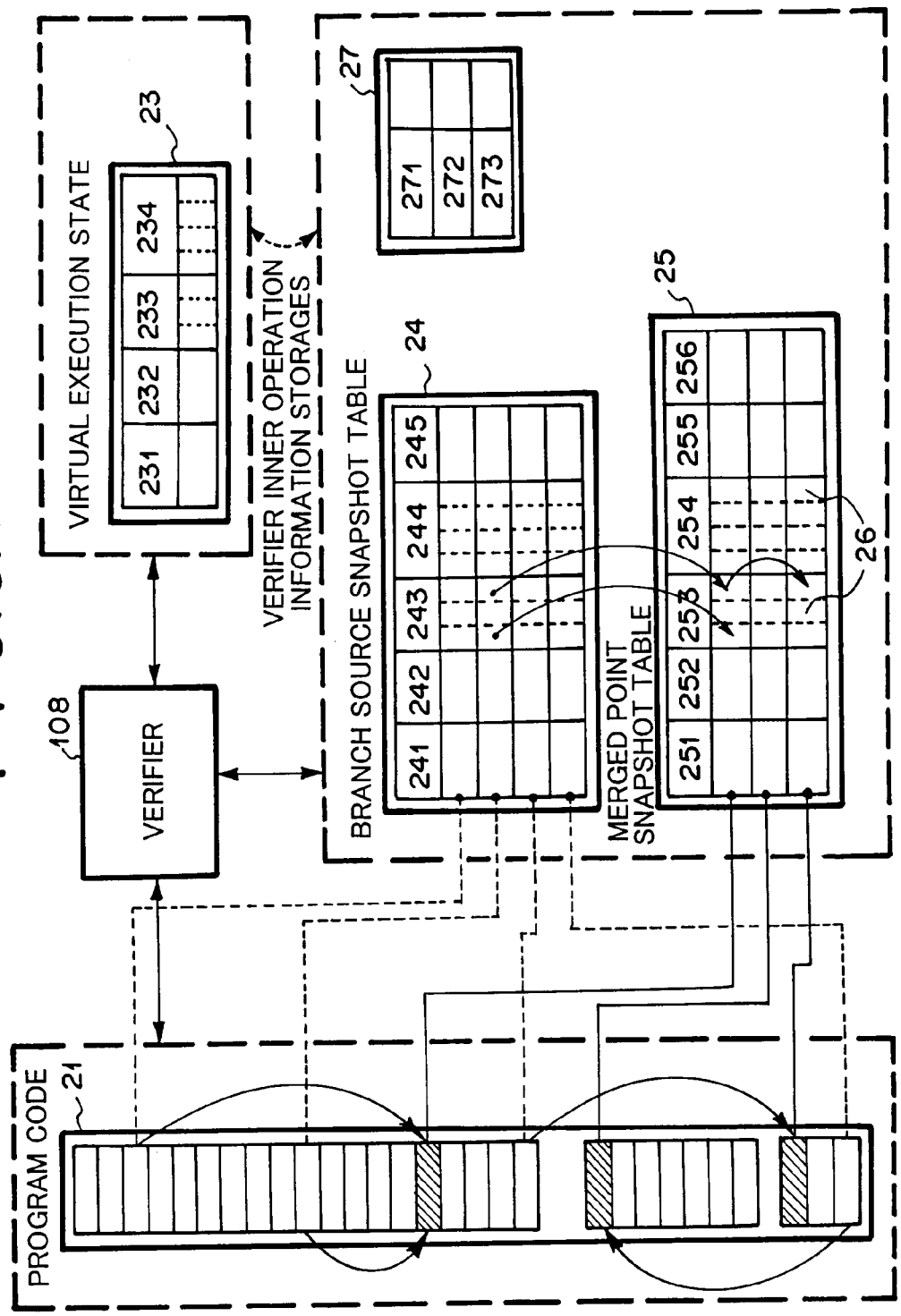

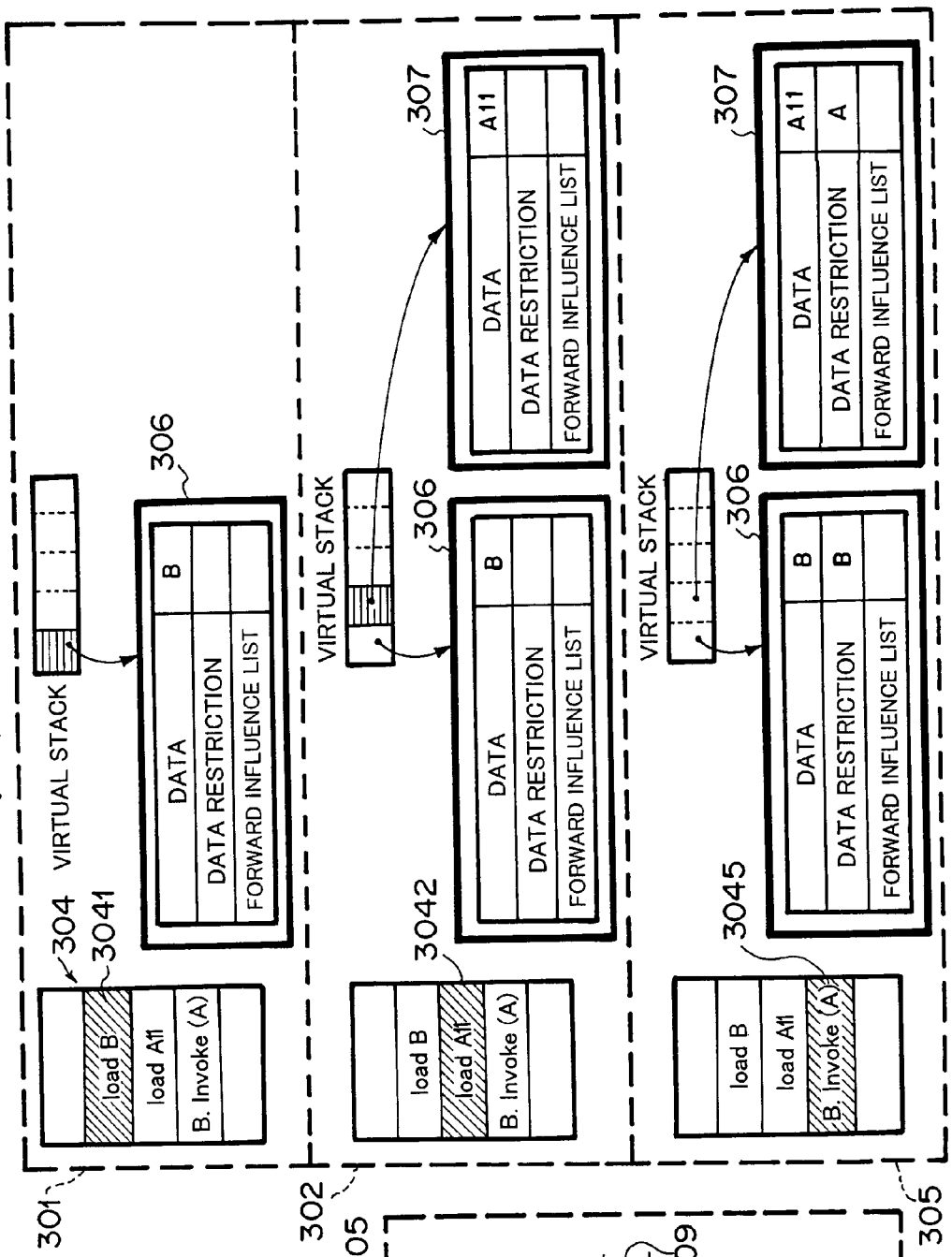

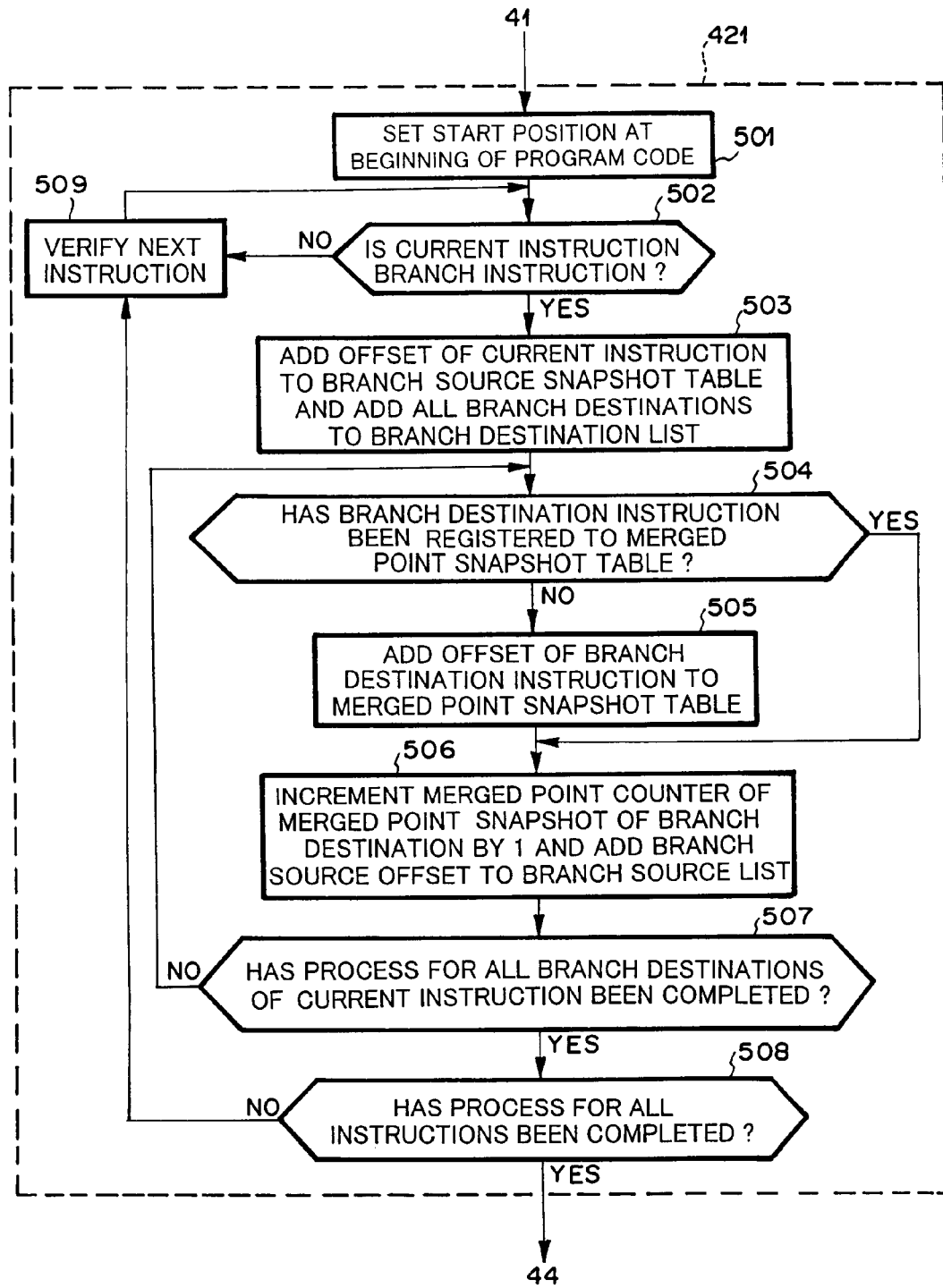

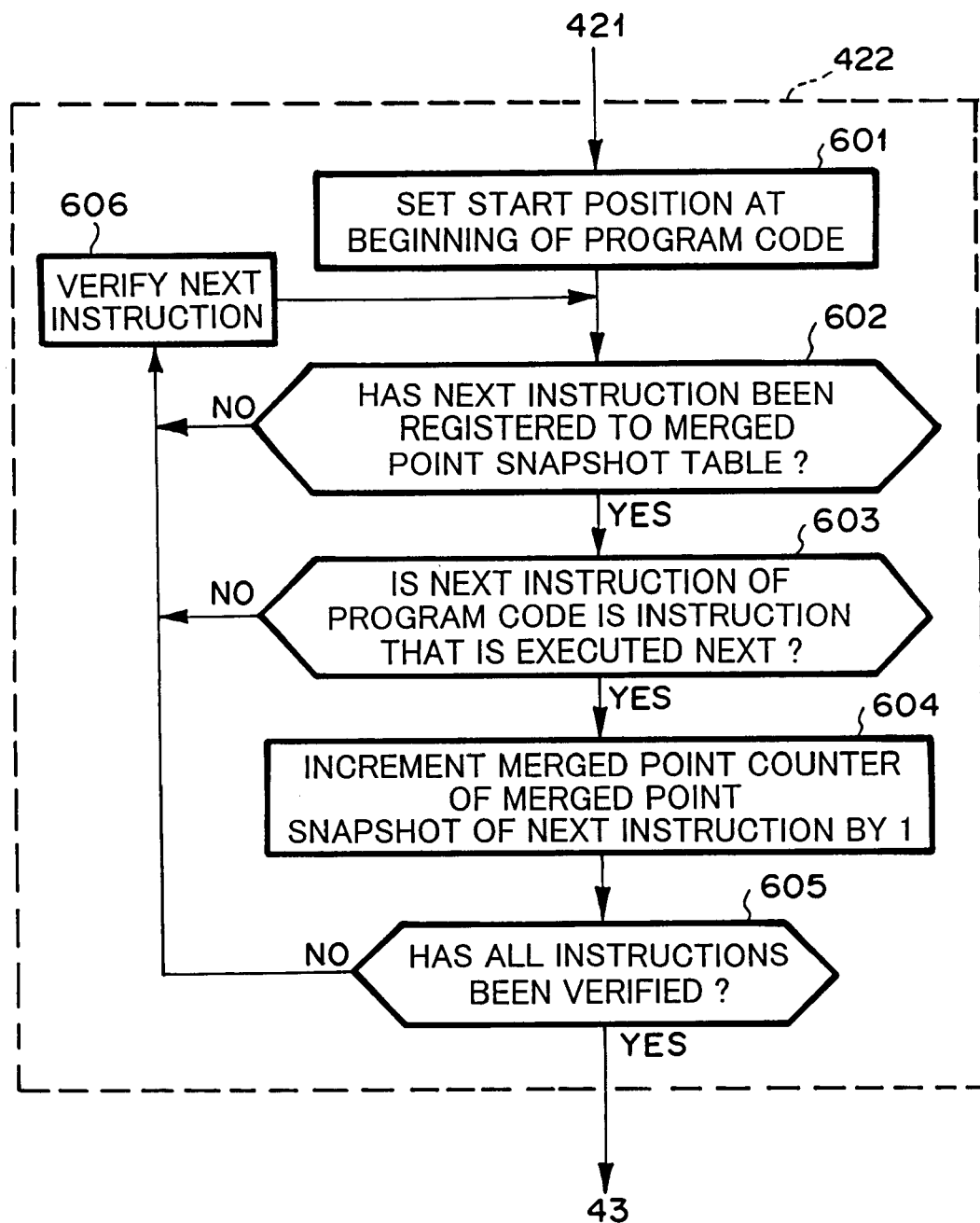

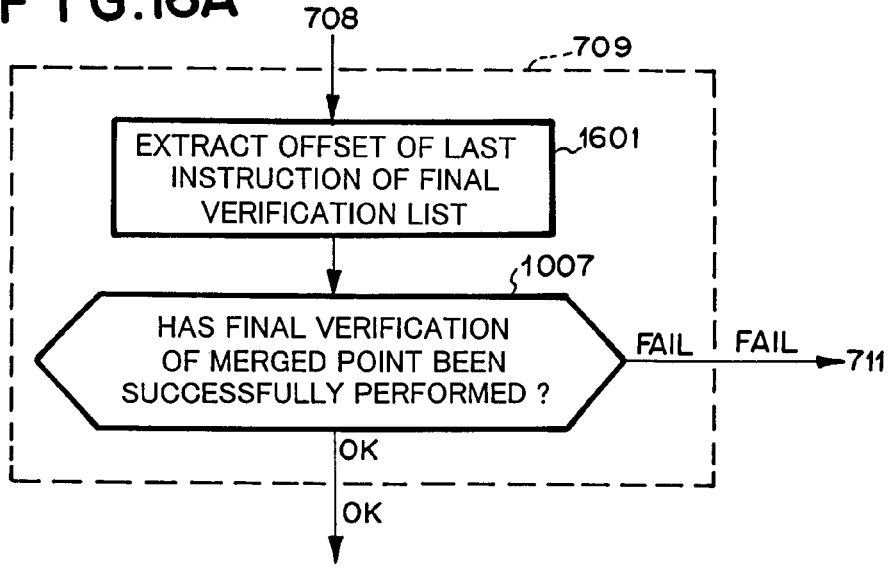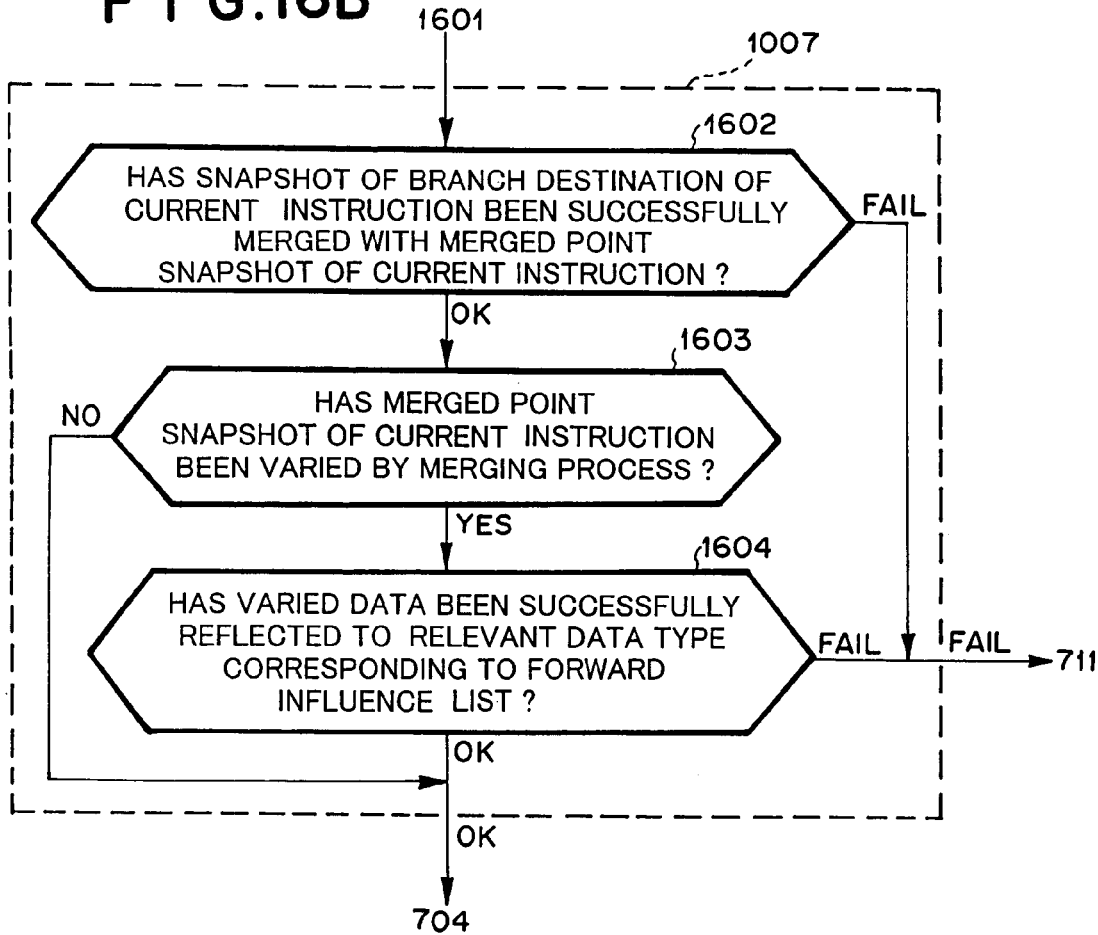

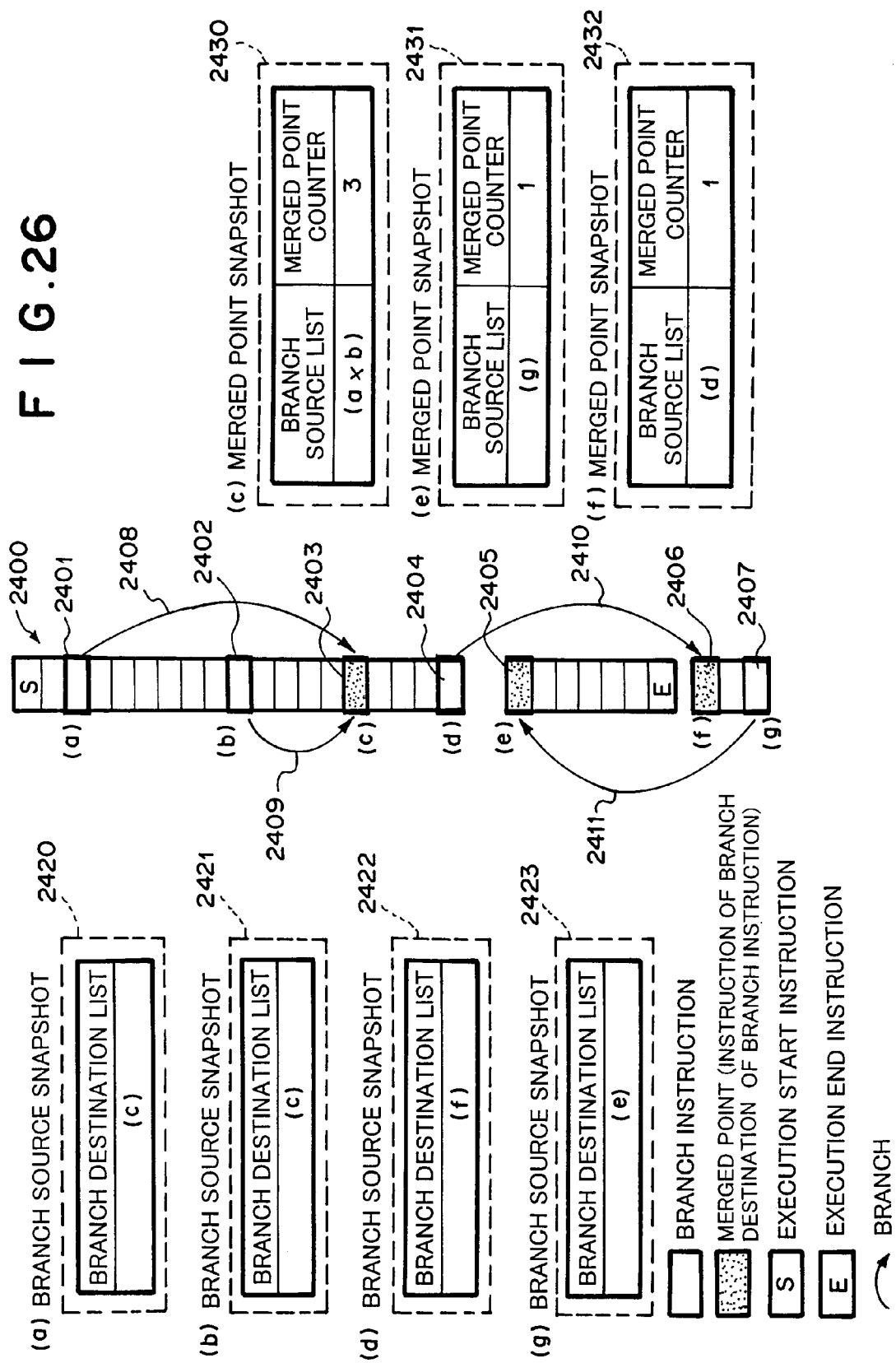

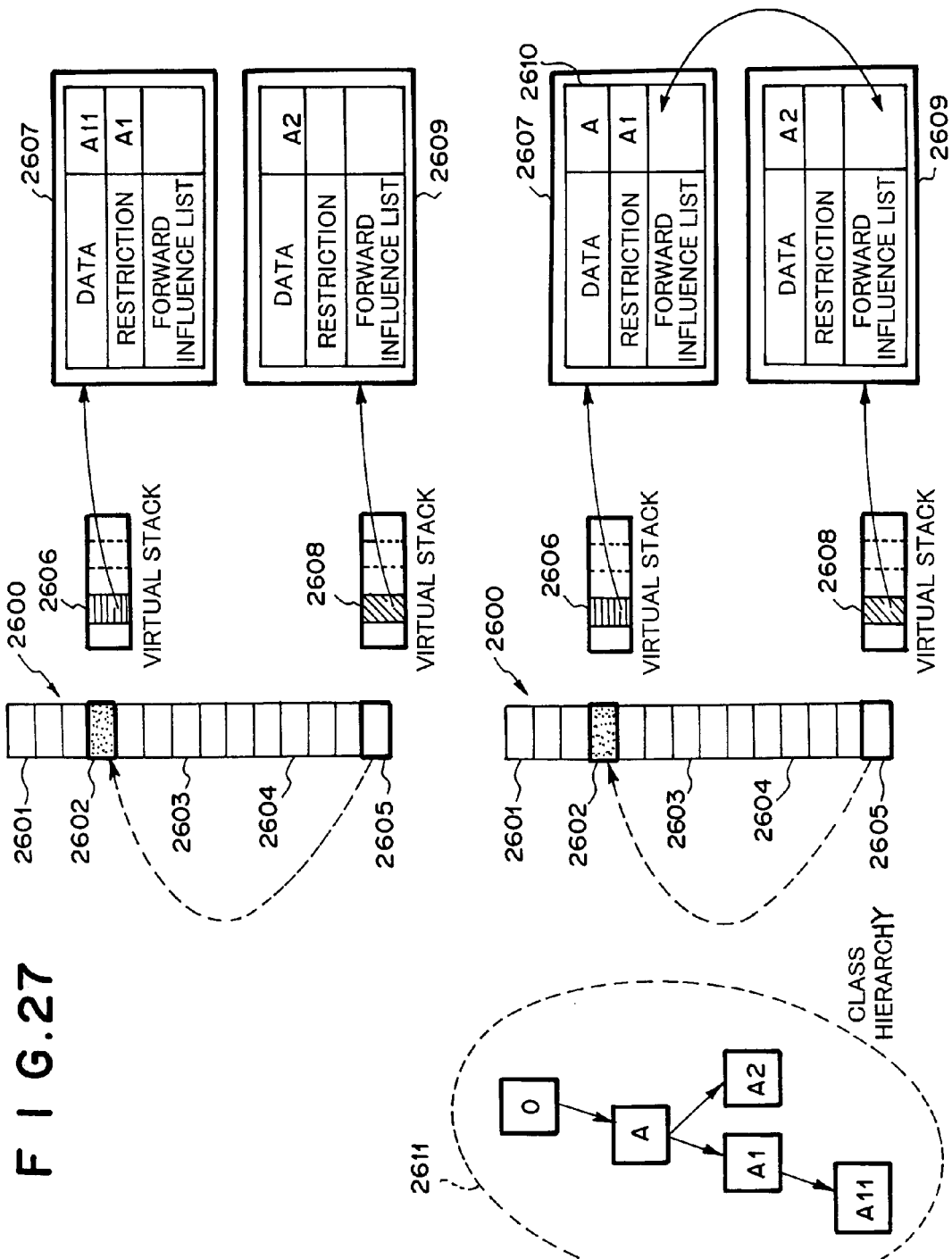

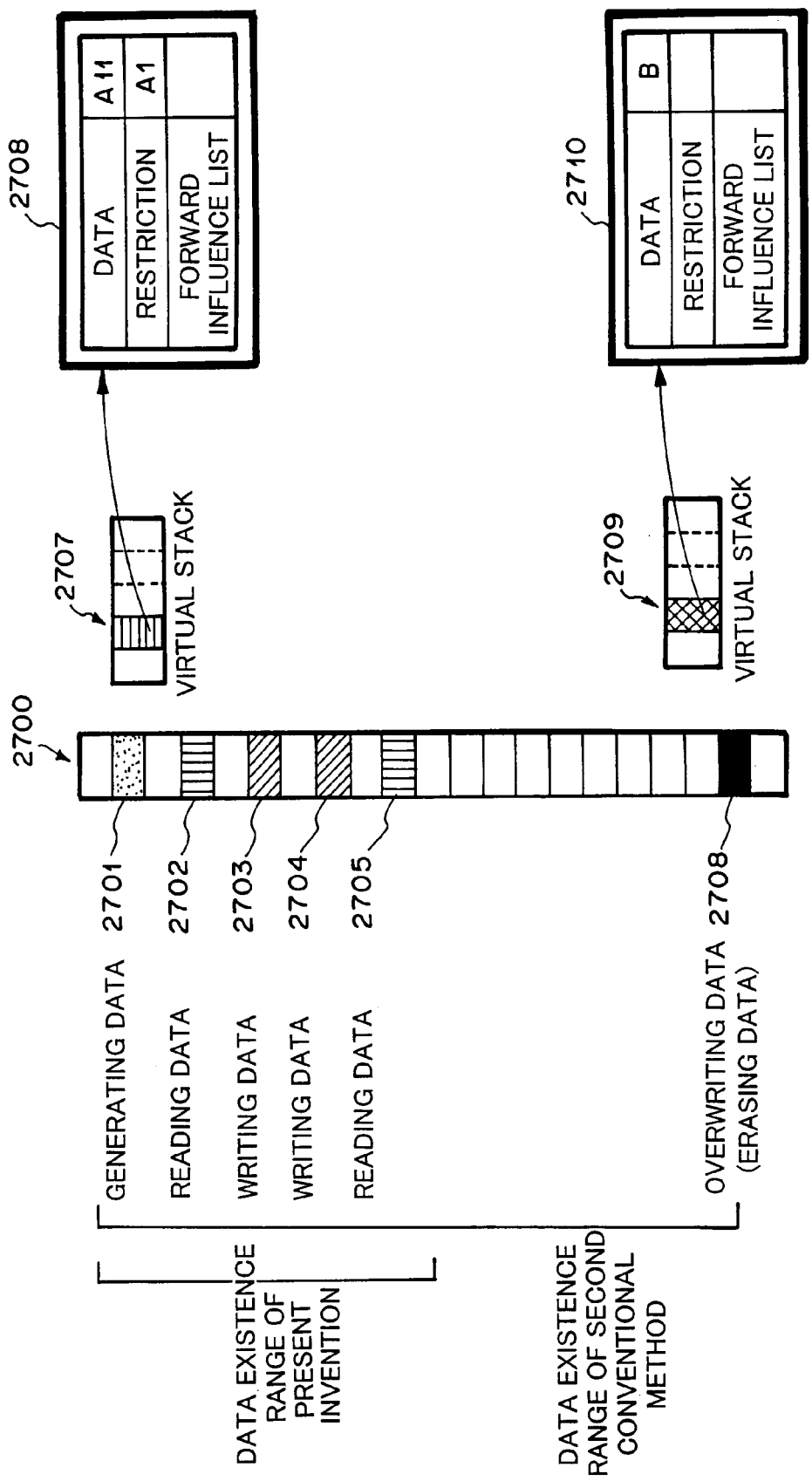

PROGRAM VERIFYING SYSTEM, PROGRAM VERIFYING METHOD, AND STORAGE MEDIUM FOR STORING SOFTWARE OF PROGRAM VERIFYING METHOD

BACKGROUND OF THE INVENTION

1. Field of the Invention

The present invention relates to an information processing apparatus as a computer system composed of a computer, in particular, to a program verifying system for verifying a program code of a primitive machine instruction set of computer software, a method thereof, and a storage medium from which a computer can read a program that causes the computer to perform the program verifying method.

2. Description of the Related Art

A program verifying method for verifying a program code during or before the execution of the program is disclosed in Japanese Patent Laid-Open Publication No.Hei-8-234994. Hereinafter, this related art reference is referred to as first conventional method. In the first conventional method, the verifying method for a program code of an interpreter type program is described.

In the first conventional method, a computer program of a server computer A that operates on an operating system A is downloaded to a user computer B that operates on an operating system B. When the user computer B checks the program code as a pre-process, if the computer B finds an instruction with a type other than restricted types from the program code of the server computer A, the instruction is prohibited from being really executed by the user computer B.

In the first conventional method, all branch instructions are checked from the program code. Stack snapshots of all branch instructions are stored in a storing portion. In the first conventional method, a pre-executing process is performed with the same data type as the main executing process for the program code. The executed state is reflected to a virtual stack of which only the data type of the program code has been simulated. The pre-executing process is successively performed from the beginning of the program. At a program position having the snapshot storing portion, data in the virtual stack is stored thereto.

In the case of a branch instruction, data in the virtual stack is stored to a snapshot storing portion of a branch destination instruction. When another instruction is executed, if data of the virtual stack is stored to the same snapshot storing portion, data of the virtual stack is compared with the stored data. When there is a difference between the snapshot and the virtual stack, the execution is prohibited. Thus, the data type of each instruction of a program code including a froward branch instruction and a backward branch instruction can be checked.

However, in the first conventional method, it is presumed that each instruction of a program code has one restriction against the type of a data stack. When there is a restriction of which only data of A type or data of B type can be dealt for an instruction X, data of A type is stored as a particular snapshot. Thereafter, when data of B type is stored as the snapshot, the program code that is not harmful is prohibited from being executed.

For a problem of which a restriction range is not uniquely settled, another related art reference has proposed one solution (refer to "The Java Virtual Machine Specification," Sun Microsystems Inc, pp. 125–137). Hereinafter, this related art reference is referred to as second conventional method.

In the second conventional method, when a plurality of different data types should exist in the same snapshot, a data type that contains all the data types is decided. The new data type is stored as a new snapshot. With the decided data type, the program code is re-executed from the new snapshot position. Thus, the data type is re-checked.

However, the program code type verifying methods in the first conventional method and the second conventional method have the following problems. A first problem of the first conventional method is in that the data type cannot be correctly verified in a primitive machine instruction set having instructions that allow a plurality of data types to be used. In other words, in the first conventional method, if data type of an instruction in a virtual execution is different at the same point of a program code, a verification error takes place. In addition, even if the first conventional method is applied to an instruction that has a plurality of data types, since the algorithm of the first conventional method does not re-execute an instruction, a varied data type cannot be re-verified.

A second problem of the first conventional method is in that the data type of a local variable cannot be correctly verified. This is because a stack snapshot stored for verifying a program code does not contain the state of a local variable. Thus, for a branch instruction, a local variable area cannot be matched. Even if a local variable contains data that remarkably violates the data type, it cannot be detected in the first conventional method.

On the other hand, a first problem of the second conventional method is in that an execution time may be very long corresponding to a program code. In other words, whenever a data type restriction range is changed for data of each stack, a virtual execution should be repeatedly performed for a stack snapshot. This problem deteriorates the effectiveness of the execution of a program code against a major object of the first conventional method.

A second problem of the second conventional method is in that since type information of unnecessary local variables is continuously stored, the storage capacity of a storing unit is wasted. This is because since a local variable that will be not be used cannot be detected, its information cannot be erased.

Thus, before a program code of a primitive machine instruction set that has instructions allowing a plurality of data types to be used is executed, data type restrictions of the individual instructions of the program code cannot be effectively verified.

SUMMARY OF THE INVENTION

An object of the present invention is to solve the above-described problems and to quickly and securely verify a program code of a primitive machine instruction set having instructions that allow a plurality of data types to be used as a data type restriction rage without need to re-execute the program code.

Another object of the present invention is to accurately obtain an effective range of individual data portion so as to effectively use a storing unit.

A first aspect of the present invention is a program verifying system for virtually verifying a program code described as a program instruction set having instructions with data type restrictions so as to determine whether or not the restrictions are correctly satisfied, comprising a data type inferring means for designating a lower limit type permissible as type information for various data types as virtually verified results and un upper limit type corresponding to the use of the data so as to infer the range of the type of each data, a merging means for merging data at a merged point of a plurality of paths due to a branch instruction in the program code and setting a common portion of the data as new data, a forward reflecting means for reflecting the change of the data to the other data that is influenced by the change of the data when the data is changed by the merging means, a forward correlating means for correlating original data and the data changed by the merging means so as to allow the forward reflecting means to select data to be reflected, and a determining means for prohibiting the program code from being really executed when the data type inferring means detects a portion that violates the type restriction in the verified program code.

A second aspect of the present invention is a storage area managing system using a system for virtually executing a program code before really executing the program code, the storage area managing system comprising a virtual executing means for verifying only a data type restriction of the program code before really executing the program code, a data valid range deciding means for deciding the final use position of each data and storing it during the process of the virtual executing means, and a storage area unallocating means for unallocating a storage area for data that exceeds the data valid range corresponding to the data validity range information designated by the data valid range deciding means during the real execution of the program code.

A third aspect of the present invention is an external storage area referencing and managing system for allowing a particular process other than a real execution of a program code to reference data in a system for verifying that the restriction of type information of the program code is not violated so as to omit the type information process in the real execution of the program code, the external storage area reference managing system comprising a virtual executing means for virtually executing the program code from the beginning to the currently executed point corresponding to the currently executed point in the real execution of the program code and corresponding to the data position information to which the particular process references, and a type information restoring means for restoring the data type information to which the virtual executing means references.

A fourth aspect of the present invention is a program verifying method for virtually verifying a program code described as a program instruction set having instructions with data type restrictions so as to determine whether or not the restrictions are correctly satisfied, comprising the steps of (a) designating a lower limit type permissible as type information for various data types as virtually verified results and un upper limit type corresponding to the use of the data so as to infer the range of the type of each data, (b) merging data at a merged point of a plurality of paths due to a branch instruction in the program code and setting a common portion of the data as new data, (c) reflecting the change of the data to the other data that is influenced by the change of the data when the data is changed at step (b), (d) correlating original data and the data changed at step (b) so as to allow data to be reflected to be selected at step (c), and (e) prohibiting the program code from being really executed when a portion that violates the type restriction in the verified program code is detected at step (a).

A fifth aspect of the present invention is a storage area managing method using a system for virtually executing a program code before really executing the program code, the method comprising the steps of (i) verifying only a data type restriction of the program code before really executing the program code, (j) deciding the final use position of each data and storing it at step (i), and (k) unallocating a storage area for data that exceeds the data valid range corresponding to the data validity range information designated at step (j) during the real execution of the program code.

A sixth aspect of the present invention is an external storage area referencing and managing method for allowing a particular process other than a real execution of a program code to reference data in a system for verifying that the restriction of type information of the program code is not violated so as to omit the type information process in the real execution of the program code, the external storage area reference managing method comprising the steps of (l) virtually executing the program code from the beginning to the currently executed point corresponding to the currently executed point in the real execution of the program code and corresponding to the data position information to which the particular process references, and (m) restoring the data type information referenced at step (l).

A seventh aspect of the present invention is a storage medium from which a computer reads a program for virtually verifying a program code described as a program instruction set having instructions with data type restrictions so as to determine whether or not the restrictions are correctly satisfied, the program causing the computer to perform the steps of (a) designating a lower limit type permissible as type information for various data types as virtually verified results and un upper limit type corresponding to the use of the data so as to infer the range of the type of each data, (b) merging data at a merged point of a plurality of paths due to a branch instruction in the program code and setting a common portion of the data as new data, (c) reflecting the change of the data to the other data that is influenced by the change of the data when the data is changed at step (b), (d) correlating original data and the data changed at step (b) so as to allow data to be reflected to be selected at step (c), and (e) prohibiting the program code from being really executed when a portion that violates the type restriction in the verified program code is detected at step (a).

An eighth aspect of the present invention is a storage medium from which a computer reads a program using a system for virtually executing a program code before really executing the program code, the program causing the computer to perform the steps of (i) verifying only a data type restriction of the program code before really executing the program code, (j) deciding the final use position of each data and storing it at step (i), and (k) unallocating a storage area for data that exceeds the data valid range corresponding to the data validity range information designated at step (j) during the real execution of the program code.

A ninth aspect of the present invention is a storage medium from which a computer reads a program for allowing a particular process other than a real execution of a program code to reference data in a system for verifying that the restriction of type information of the program code is not violated so as to omit the type information process in the real execution of the program code, the program causing the computer to perform the steps of (l) virtually executing the program code from the beginning to the currently executed point corresponding to the currently executed point in the real execution of the program code and corresponding to the data position information to which the particular process references, and (m) restoring the data type information referenced at step (l).

These and other objects, features and advantages of the present invention will become more apparent in light of the following detailed description of a best mode embodiment thereof, as illustrated in the accompanying drawings.

BRIEF DESCRIPTION OF DRAWINGS

FIG. 2 is a functional block diagram according to the first embodiment of the present invention;

FIGS. 3A, 3B and 3C are block diagrams and a class hierarchy diagram for explaining a practical example of the operation according to the first embodiment of the present invention;

FIG. 5 is a flow chart showing the operation according to the first embodiment of the present invention;

FIG. 6 is a flow chart showing the operation according to the first embodiment of the present invention;

FIGS. 16A & B are flow charts showing the operation according to the first embodiment of the present invention;

FIG. 26 is a schematic diagram for explaining a practical example of the operation according to the first embodiment of the present invention;

FIG. 27 is a schematic diagram for explaining a practical example of the operation according to the first embodiment of the present invention; and FIG. 28 is a schematic diagram for explaining a practical example of an operation according to a third embodiment of the present invention.

DESCRIPTION OF PREFERRED EMBODIMENTS

Next, with reference to the accompanying drawings, embodiments of the present invention will be described.

[First Embodiment]

Next, with reference to the accompanying drawings, a first embodiment of the present invention will be described.

Figure 1:
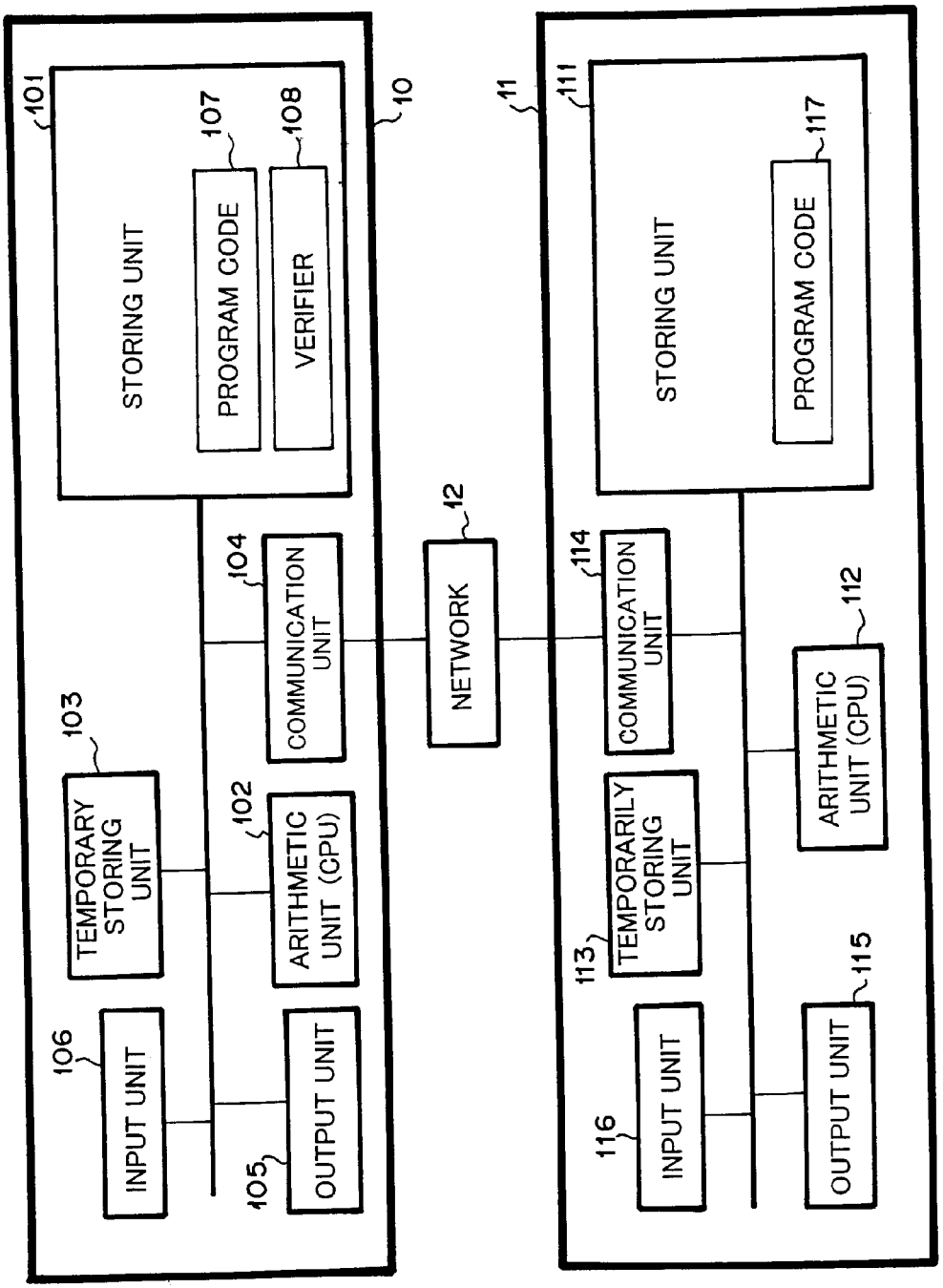
FIG. 1 is a block diagram showing the structure of a system according to a first embodiment of the present invention.

FIG. 1 is a block diagram showing the structure of a system according to a first embodiment of the present invention. Referring to FIG. 1, the system is composed of computers 10 and 11 and a network 12. The computers 10 and 11 may be units equivalent to computers. The network 12 is for example Internet or LAN. The network 12 connects the computers 10 and 11. The computer 10 comprises an input unit 106 (such as a keyboard), an output unit 105 (such as a display and/or a printer), an arithmetic unit 102 (such as a CPU), a communication unit 104 (connected to the network 12), and a storing unit 102 (that stores a program and data). The computer 10 may further comprise a temporary storing unit 103 that has a higher performance than the storing unit 101. The temporary storing unit 103 may perform a part of the storing unit 101.

According to the first embodiment, the system also has the computer 11 with the same structure as the computer 10. As with the computer 10, the computer 11 comprises an input unit 116, an output unit 115, an arithmetic unit 112, a communication unit 114, and a storing unit 111. The computer 10 and the computer 11 are connected to the network 12 through the communication units 104 and 114, respectively. The computer 10 also comprises a verifier 108 that is a main feature of the present invention. Likewise, the computer 11 also comprises a program code 117. The system according to the first embodiment of the present invention is structured as described above.

It is assumed that the user causes the computer 10 read the program code 117 from the computer 11 through the network 12 and causes the computer 10 to execute the program code 117.

The program code 117 is a program code composed of an instruction set having instructions with data type restrictions that can be operated.

The program code 117 is not always a reliable code for the computer 10. Thus, the arithmetic unit 102 that has a CPU that controls all the operations of the computer 10 causes the verifier 108 to verify the program code 117 after the computer 10 reads the program code 117 until the computer 10 executes the program code 117. Thus, before the arithmetic unit 102 executes the program code 117, the verifier 108 detects a harmful code that causes the stack from overflowing or becoming empty or that causes a data type violation from taking place.

Thus, when the arithmetic unit 102 executes the program code 117, it does not need to determine whether or not the program code 117 causes a harmful operation to take place. Consequently, the arithmetic unit 102 can quickly execute the program code 117.

In addition, since the verifier 108 verifies the program code 107 of the computer 10 before the arithmetic unit 102 executes the program code 107, the arithmetic unit 102 can prevent a harmful operation from taking place or quickly execute the program code 107.

Next, the program code verifying means of the verifier 108 will be described.

FIG. 2 is a functional block diagram showing the internal structure of the verifier 108 according to the first embodiment of the present invention. FIG. 2 shows areas of the storing unit that stores information used for the verifier 108. The areas of the storing unit are a program code 21, a virtual execution valid point list 22, a virtual execution state 23, a branch source snapshot table 24, and a merged point snapshot table 25. The program code 21 is an instruction set having instructions with data type restrictions. The virtual execution valid point list 22 represents a verification point that the verifier 108 currently verifies in the program code 21. The virtual execution state 23 stores data of a virtual stack that the verifier 108 requires for verifying the program code 21. The branch source snapshot table 24 will be described later.

The program code 21 is composed of an instruction set having instructions 211 with data type restrictions.

The virtual execution valid point list 22 is composed of three portions that are an immediate execution list 221, a waiting list 222, a final verification list 223. The immediate execution list 221 stores a point at which the verifier 108 starts verifying in the program code 21. In addition, the immediate execution list 221 stores a virtual execution state necessary for the verifier 108 to verify the program code 21. The waiting list 222 stores the imperfectly calculated result necessary for the verifier 108 to verify the program code 21. The final verification list 223 stores the remaining virtual execution state that the verifier 108 will verify the program code 21.

The verifier 108 starts verifying the program code 21 from the beginning, stores the execution state in the middle of the verifying process to the branch source snapshot table 24 and the merged point snapshot table 25, and manages each verification resumption point with the virtual execution valid point list 22.

The virtual execution state 23 stores the execution state of which the verifier 108 virtually executes the program code 21. The virtual execution state 23 is composed of a program counter 231, a stack counter 232, a virtual stack 233, and a virtual local variable 234. The program counter 231 represents at which portion the verifier 108 is executing in the program code 21. The stack counter 232 represents the amount of data stored in the stack. The virtual stack 233 represents the data type of the current data of the stack. The virtual local variable 234 represents the data type of the current local variable. They are used as source information for the verifier 108 to store information to the branch source snapshot table 24 and the merged point snapshot table 25.

The branch source snapshot table 24 stores information corresponding to the number of branch instructions of the program code 21. The information stored in the branch source snapshot table 24 includes an offset 241, a stack counter 242, a virtual stack 243, a virtual local variable 244, and a branch destination list 245. The offset 241 represents the position of an instruction of the program code 21. The stack counter 242 is equivalent to the virtual execution state 23. The branch destination list 245 stores all offsets 241 of branch destination instructions.

Unlike with the branch source snapshot table 24, the merged point snapshot table 25 stores information of offsets 251 of branch instructions of the program code 21. As with the branch source snapshot table 24, information stored in the merged point snapshot table 25 includes an offset 251, a stack counter 252, a virtual stack 253, a virtual local variable 254, a branch source list 256, and a merged point counter 255. The branch source list 256 stores offsets of all branch source instructions. The merged point counter 255 stores the number of branch instructions as branch destinations of the offset 251.

The virtual stacks 233, 243, and 253 and the virtual local variables 34, 244, and 254 have the same data structure. Each of the virtual stacks 233, 243, and 253 and the virtual local variables 34, 244, and 254 is composed of a virtual stack to a data structure 27 and data pointers 26 of virtual local variables.

The data structure 27 includes data 271, data restriction 272, and forward influence list 273. The data 271 stores a type that designates the lower limit of a data type. The data restriction 272 stores a restriction condition (upper limit) of a data type. The forward influence list 273 is a pointer to data with the same origin.

FIG. 3A is a schematic diagram showing the program verifying system according to the present invention. The verifier 108 reads an instruction from the program code 21 and virtually executes the instruction. The verifier 108 writes the varied stack value and local variable values to the virtual execution state 23. Thus, as with the real execution of the instruction, the variables are simulated. When the program code 21 has a branch instruction, a branch source snapshot and a merged point snapshot corresponding to a branch source instruction and a branch destination instruction are generated in the branch source snapshot table 24 and the merged point snapshot 25, respectively. Thus, the contents of the virtual execution state 23 at which each instruction is virtually executed are stored.

Each of the virtual stacks and the virtual local variable stores a data pointer 26 that represents the data structure 27. The verifier 108 virtually executes each instruction of the program code 21 and reflects the varied data structure to each data structure 27.

FIG. 3B is a schematic diagram for explaining a data change of a data structure and the basic concept of the present invention. In FIG. 3B, a program code 304 is exemplified. In this example, an object oriented program having a class hierarchy is described. A class hierarchy 305 represents the hierarchical relation of classes. In this example, the data structure is varied in the order of steps 301, 302, and 303.

At step 301, an instruction 3041 that is "load B" is virtually executed. Thus, data B is loaded. At this point, a data structure 306 that represents the contents of the virtual stack is generated. The data B is written to the generated data structure 306.

Likewise, at step 302, an instruction 3042 that is "load All" is virtually executed. Thus, data All is loaded. At this point, a data structure 307 that represents the contents of the virtual stack is generated. The data All is written to the data structure 307.

Thereafter, at step 303, an instruction 3043 that is "B. Invoke (A)" is virtually executed. In other words, a function B is invoked with an argument A. Since the data structures 306 and 307 are used as restricted data "function B" and "argument A", the data is restricted. In this case, since the data structure 306 is used as B, B is written to the data restriction. On the other hand, since the data structure 307 is used as A, A is written to the data structure.

In such a manner, the range of the maximum value (upper limit) and the minimum value (lower limit) of data of each data structure is designated. In the example shown in FIG. 3B, both the upper limit and lower limit of the data structure 306 are B. Thus, data in a range 309 of the class hierarchy 305 is restricted to B as shown in FIG. 3C. On the other hand, the upper limit and lower limit of a data structure 307 are A and All, respectively. Thus, the data range is predicted with a range 308 shown in FIG. 3C.

Thus, according to the present invention, each data is represented with a range thereof. When the upper limit and lower limit are inverted (namely, when an upper limit that is smaller than a lower limit or vice versa is designated), it is determined that such a program code is harmful and the execution of the program code is prohibited. This operation is the basic operation of the present invention.

Next, an embodiment for verifying a program code 21 using such information will be described in detail.

Figure 4A:
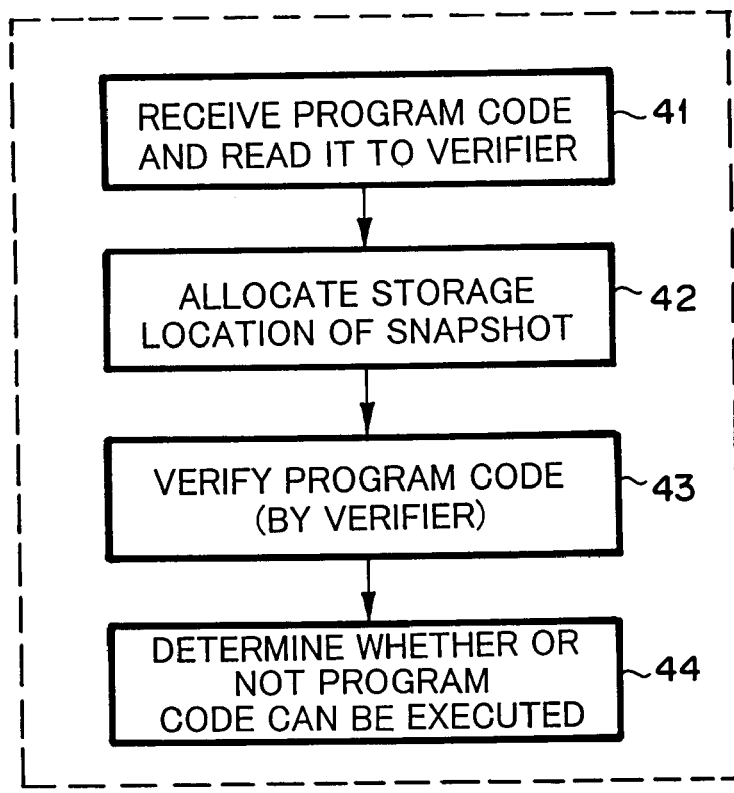
FIGS. 4A and 4B are flow charts showing the operation according to the first embodiment of the present invention.

FIG. 4A is a flow chart showing a verifying process of the program code 21. At step 41, the program code 21 is read to the storing unit as a pre-process of the present invention. At step 44, it is determined whether or not the program code 21 can be executed corresponding to the verified result as a post-process of the present invention. At steps 42 and 43 shown in FIGS. 4A and 4B, the main process of the present invention is performed.

Figure 4B:
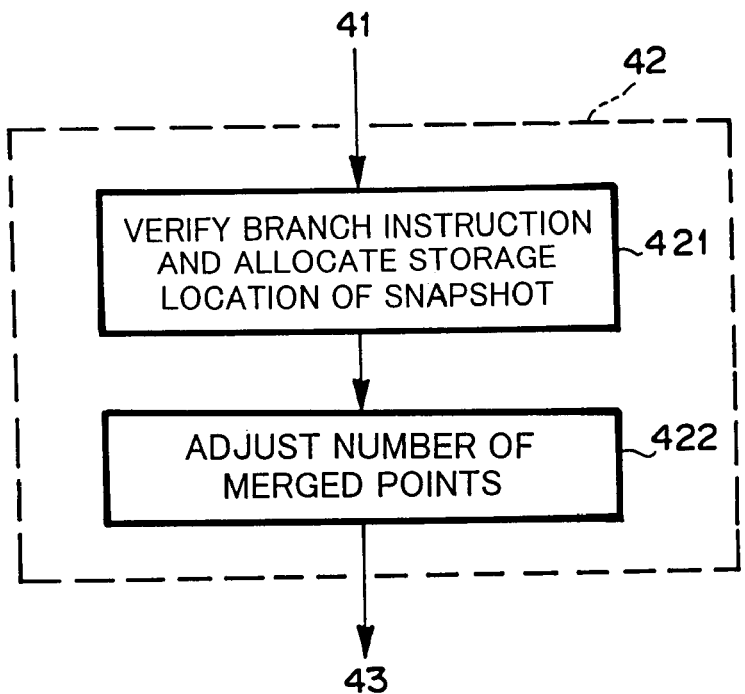

Hereinafter, step 42 shown in FIG. 4A and step 43 shown in FIG. 4B are referred to as path 1 and path 2, respectively. In the path 1, a branch instruction is searched from the program code 21. Information of the branch source and the branch destination of the branch instruction is stored to the branch source snapshot table 24 and the merged point snapshot table 25, respectively.

The path 1 is separated into steps 421 and 422 shown in FIG. 4B. Steps 421 and 422 are referred to as paths 1-1 and 1-2, respectively.

Figure 25:
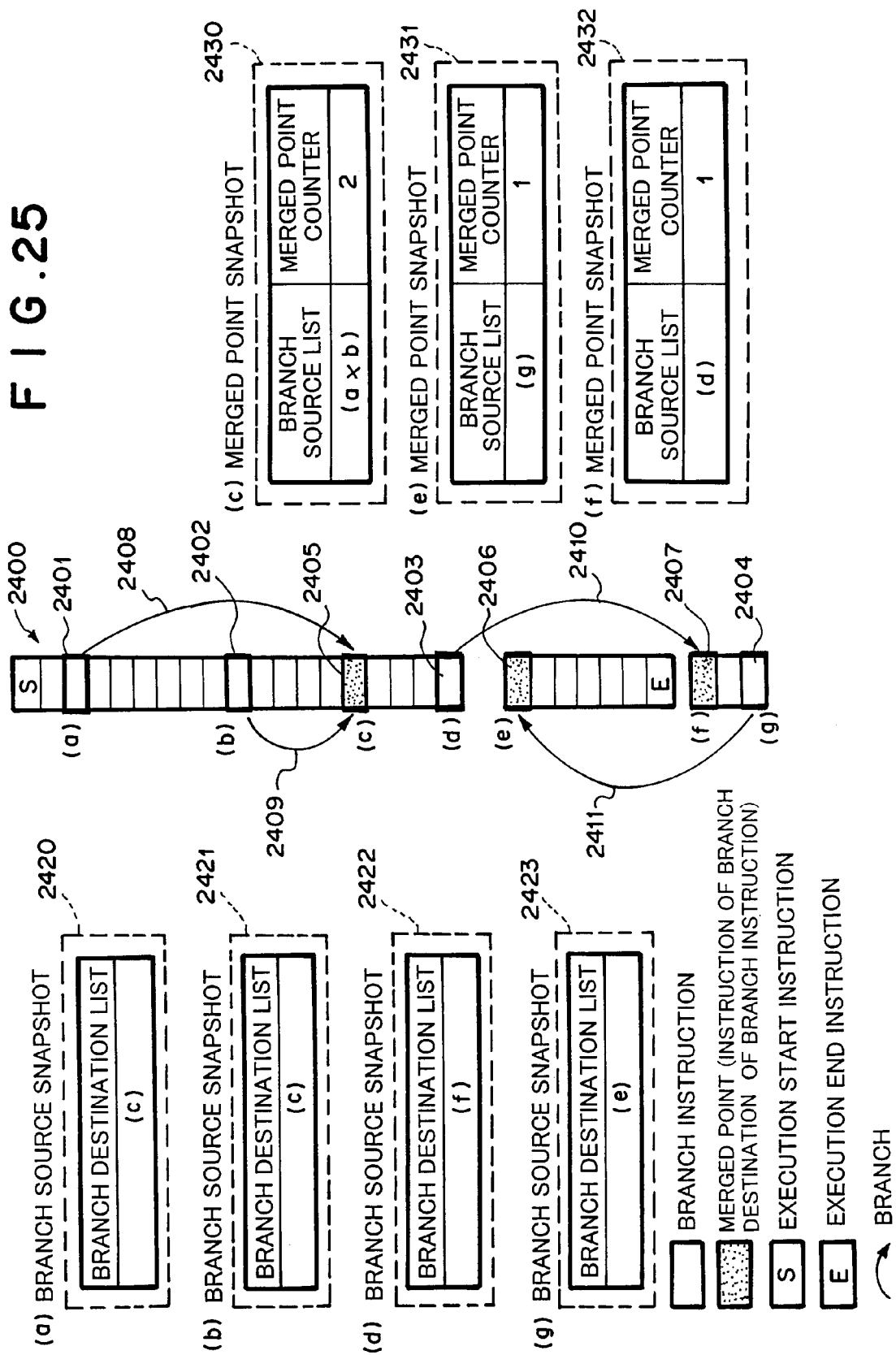
FIG. 25 is a schematic diagram for explaining a practical example of the operation according to the first embodiment of the present invention.

FIGS. 5 and 25 are a flow chart and a schematic diagram showing the process of the path 1-1. FIGS. 6 and 26 are a flow chart and a schematic diagram showing the process of the path 1-2.

In the path 1-1, at step 501, the execution start positon is set at the beginning of the program code 21. At step 502, it is determined whether or not each instruction of the program code 21 is a branch instruction. When the determined result at step 502 is No, the flow advances to step 509. At step 509, the next instruction is verified. When the determined result at step 502 is Yes, the flow advances to step 503. At step 503, the current offset is additionally recorded to the branch source snapshot table. Offsets of all branch destinations that may be branched from the current branch instruction are recorded to the branch destination list.

For each branch destination instruction, processes at steps 504 to 506 are performed. At step 504, it is determined whether or not the offset of the branch destination has not been registered to the merged point snapshot table 25. When the determined result at step 504 is No, the offset of the branch destination is recorded to the merged point snapshot table 25. Thereafter, the merged point counter of the merged point snapshot corresponding to the branch destination is incremented by 1 (at step 505). The offset of the branch instruction is added to the merged point snapshot branch source list (at step 506). After the process for all the branch destinations has been completed, the next instruction is verified (at step 507).

After the process for all the instruction of the program code has been completed, the branch relation of all the instructions of the program code is stored to the branch source snapshot table and the merged point snapshot table.

FIG. 25 shows an example of the path 1-1 corresponding to the pattern of a program code 2400. Arrows 2408 to 2411 of the program code represent branches of the program code 2400. In the path 1-1, the program code 2400 is verified from the beginning thereof. Since an instruction 2401 is a branch instruction, a branch source snapshot 2420 corresponding to the branch instruction 2401 is added to a branch source snapshot table. An offset of a branch destination instruction 2405 is added to the branch destination list (see part (a) of FIG. 25). After it is determined that the branch destination instruction 2405 has not been registered to the merged point snapshot table, a merged point snapshot 2430 corresponding to the branch destination instruction 2405 is added to the merged point snapshot table (see part (c) of FIG. 25). An offset of the branch source instruction 2401 is added to the branch source list of the merged point snapshot 2430.

By repeating the similar process, information of the branch source snapshot tables (24) 2420 to 2423 and merged point snapshot tables (25) 2430 to 2432 are stored as the branch source snapshot and the merged point snapshot.

Next, as shown in FIG. 6, in the path 1-2, the program code is verified from the beginning thereof (at step 601). In the process, the number of merged points is adjusted. At step 602 shown in FIG. 6, it is determined whether or not the next instruction of the current instruction has been stored to the merged point snapshot table 25. When the determined result at step 602 is No, the flow advances to step 606. At step 606, the next instruction is verified. When the determined result at step 602 is Yes, the flow advances to step 603. At step 603, it is determined whether or not the currently verified instruction is an instruction that is executed next. "Next instruction" is an instruction that is preceded by the currently executed instruction. In contrast, "instruction that is executed next" is an instruction that may be executed after the currently executed instruction.

In the example shown in FIG. 25, since the instruction 2404 is an absolute branch instruction, the next instruction 2405 is not an "instruction that is executed next".

At step 603 shown in FIG. 6, it is determined whether the next instruction of the currently executed instruction is an instruction that is executed next. When the determined result at step 603 is Yes, the flow advances to step 604. At step 604, the merged point counter 1 of the merged point snapshot of the next instruction is incremented by 1.

In the example of the program code 2400 shown in FIG. 25, only the instruction 2403 satisfies such a pattern as shown in FIG. 26. Thus, the value of the merged point counter of the instruction 2403 is changed from 2 to 3.

After the processes of the path 1 (namely, the paths 1-1 and 1-2) have been completed, the program code verifying process is performed at step 43 (as the path 2).

FIGS. 7 to 24 are flow charts showing processes at step 43 (path 2) shown in FIG. 4. In the path 2, the program code is verified from the beginning thereof. The path 2 is an algorithm performed after the path 1. In the path 2, the program code is really verified.

Figure 7:
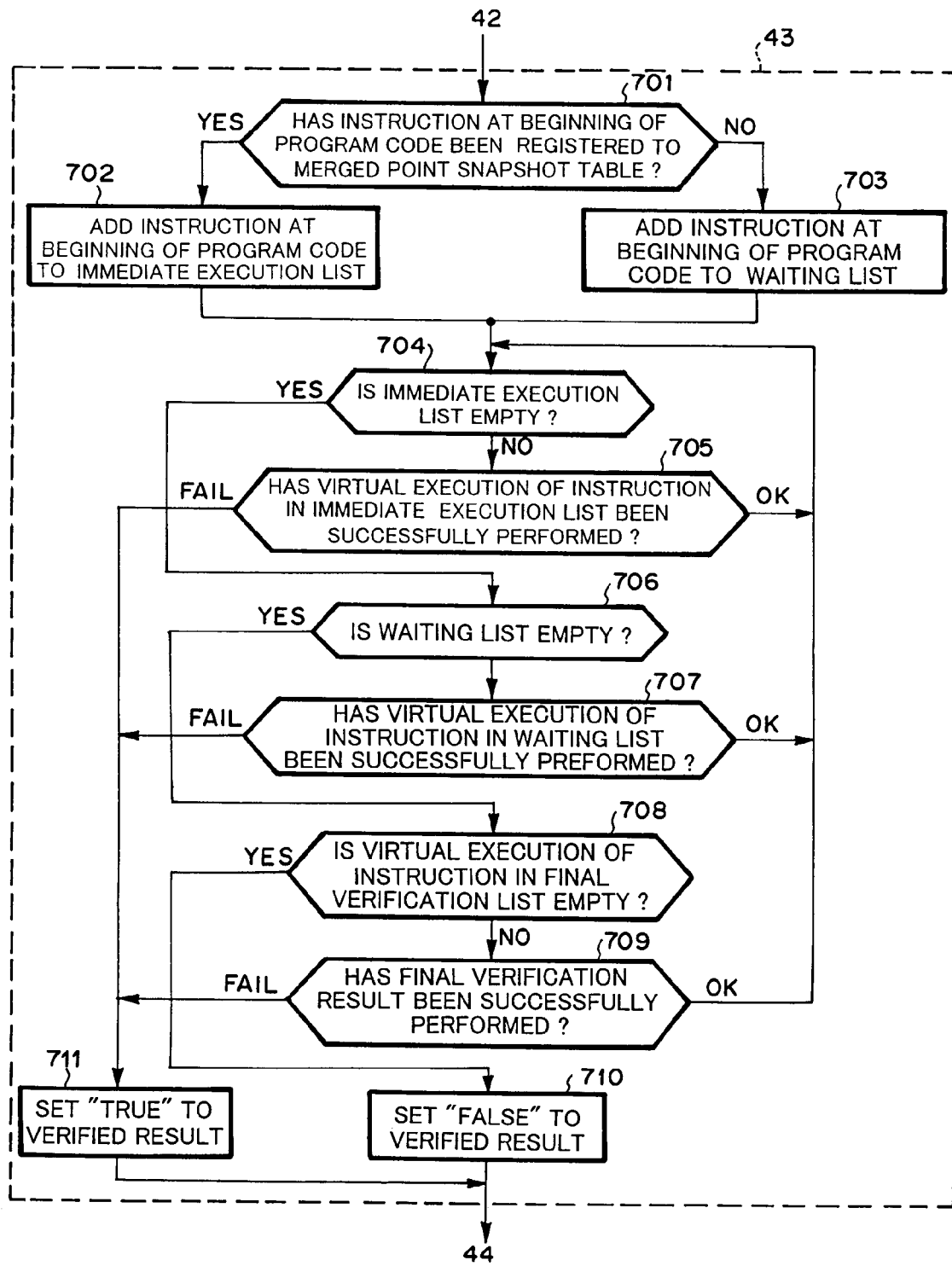
FIG. 7 is a flow chart showing the operation according to the first embodiment of the present invention.

FIG. 7 is a flow chart showing the overall processes of the path 2. At step 701, it is determined whether or not a merged point snapshot corresponding to an instruction at the beginning of the program code has been created. When the determined result at step 701 is Yes, the instruction at the beginning of the program code is added to the waiting list (at step 702). When the determined result at step 701 is No, the instruction at the beginning of the program code is added to the immediate execution list (at step 703).

The three lists of the immediate execution list 221, the waiting list 222, and the final verification list 223 of the virtual execution valid point list 22 are checked. Namely, after the process at step 702 or 703 has been completed, the flow advances to step 704. At step 704, it is determined whether or not the immediate execution list 221 is empty. When the determined result at step 704 is No, an instruction represented by an offset in the immediate execution list 221 is virtually executed. When the determined result at step 704 is Yes, the flow advances to step 706. At step 706, it is determined whether or not the waiting list 222 is empty. When the determined result at step 706 is No, an instruction represented by an offset in the waiting list 222 is virtually verified. When the determined result at step 706 is Yes, the flow advances to step 708. At step 708, it is determined whether or not the final verification list 223 is empty. When the determined result at step 708 is No, the instruction represented by an offset in the final verification list 223 is finally verified.

When one of the determined results of the determining steps 704, 705, 706, 707, 708, and 709 is fail, the verified result in the path 2 is fail. At this point, the flow advances to step 711. At step 711, "false" is set as the verified result of the program code. When one of the determined result of the determining steps 704, 705, 706, 707, 708, and 709 is not fail, the flow advances to step 710. At step 710, "true" is set as the verified result of the program code.

Figure 8:
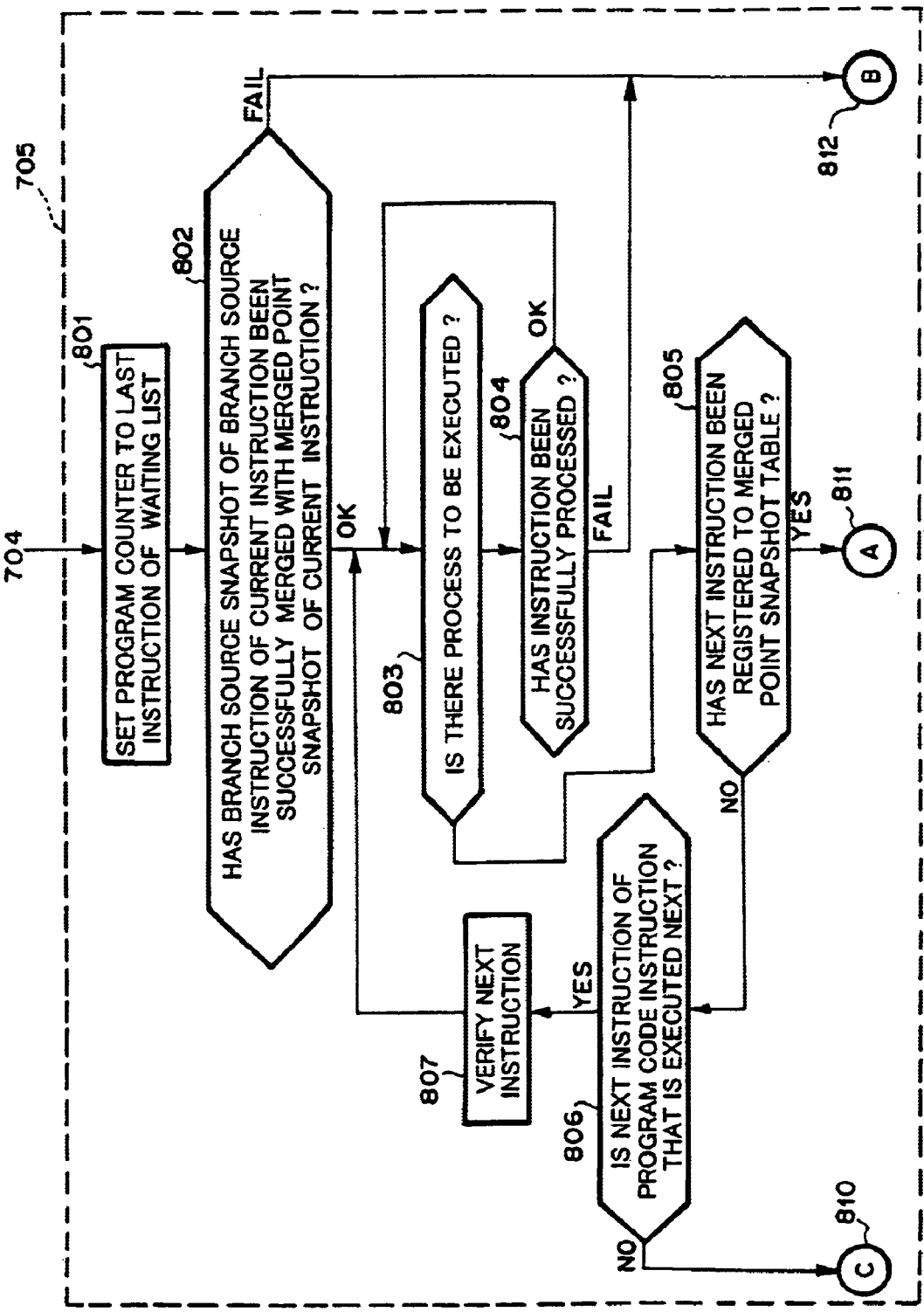
FIG. 8 is a flow chart showing the operation according to the first embodiment of the present invention.
Figure 9:
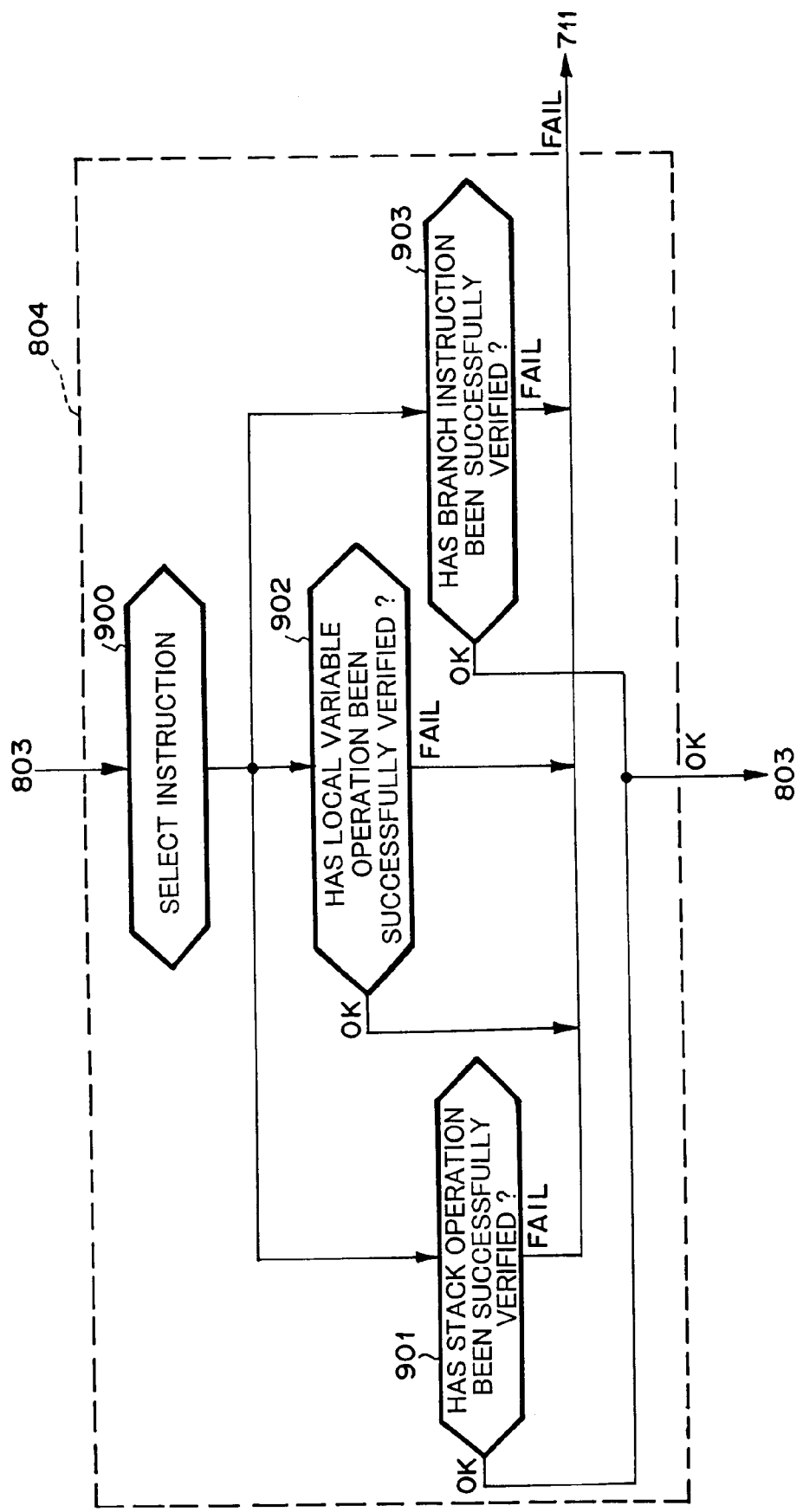
FIG. 9 is a flow chart showing the operation according to the first embodiment of the present invention.
Figure 10:
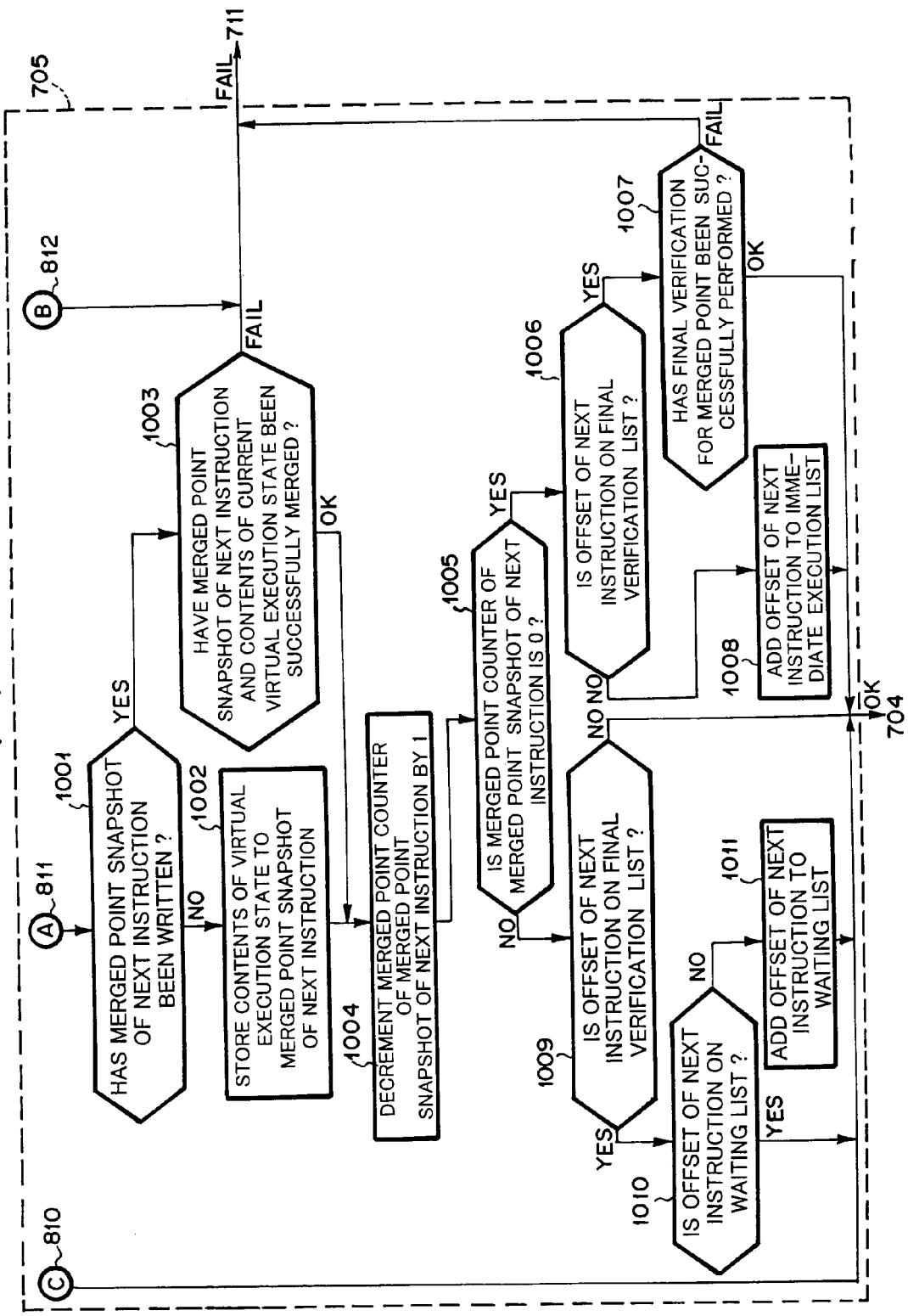
FIG. 10 a flow chart showing the operation according to the first embodiment of the present invention.

FIGS. 8, 9, and 10 are flow charts showing processes of the immediate execution list at step 705 shown in FIG. 7. The verifier 108 extracts one offset from the immediate execution list. When the immediate execution list has a plurality of offsets, although it is preferred that the verifier 108 extracts the latest offset from the immediate execution list for high efficiency, the extracting order of offsets do not influence the result (at step 801).

Virtual stacks and virtual local variables of a branch source snapshot corresponding to an offset as a branch destination are merged to the merged point snapshot of the extracted offset (at step 02). The result is set to the virtual stack and the virtual local variable of the merged point snapshot. Instructions that are merged to the offset can be categorized as a branch instruction and a preceding instruction of which the offset is decided as an instruction that is executed next. For the former instruction, the branch source snapshots 242 to 246 are referenced from the branch source snapshot table 24.

For the latter instruction, the offset is decided as an instruction that is executed next. When the preceding instruction is virtually executed, the virtually executed state is stored to the merged point snapshot of the offset. When merged, the merged point snapshot is referenced. The offset stored in the immediate execution list is an offset of which the virtually executed states of all instructions merged at the offset have been securely stored as snapshots.

After the virtual stack 253, the virtual local variable 254, and the stack counter 252 of the merged point snapshot have been generated, the contents are copied to the virtual execution state 23 so as to virtually execute the program code. This virtual execution is continued until the next merged point is detected or an instruction that is executed next is detected (at steps 806 and 807).

As shown in FIG. 9, while the program code is being virtually executed, a stack operation 901, a local variable operation 902, and a branch instruction 903 are verified for each instruction in the same order as the real execution so as to verify each instruction. When an instruction for reading data from a local variable and pushing the data to a stack is verified, a data pointer is read from a virtual local variable (at step 902 of step 804). Thereafter, the data pointer that is read at step 902 is pushed to the virtual stack (at step 901 of step 804).

When the determined result at one of the processes at steps 901, 902, and 903 is fail, the immediate execution list process at step 705 is fail. Thus, the flow advances to step 711. At step 711, "fail" is set as the verified result.

As shown in FIG. 10, when the virtual execution is terminated at step 810 shown in FIG. 8, the immediate execution list process at step 705 returns OK. When the virtual execution is terminated at step 812 shown in FIG. 8, the immediate execution list process at step 705 returns fail. When the virtual execution is terminated at step 811 shown in FIG. 8, because the next instruction is a merged point, the immediate execution list process at step 705 reflects the current virtual execution state to the merged point snapshot of the next instruction.

FIG. 10 is a flow chart showing a process for reflecting the current virtual execution state to the merged point snapshot of the next instruction. The process shown in FIG. 10 is a part of the immediate execution list process at step 705. Branches 810 to 812 shown in FIG. 10 correspond to branches 810 to 812 shown in FIG. 8. Branch 811 is the case that the next instruction is a merged point.

It is determined whether or not the virtual stack, the virtual local variable, and the stack counter of the merged point snapshot of the next instruction have been written (at step 1001). When the determined result at step 1001 is No, the contents of the current virtual execution state 23 are directly written to the merged point snapshot of the next instruction (at step 1002). When the determined result at step 1001 is Yes (namely, another branch instruction has been written to the merged point snapshot), the data in the merged point snapshot and the current virtual execution state are merged so as to determine the virtual stack, the virtual local variable, and the stack counter of the merged point snapshot (at step 1003). When the determined result at step 1003 is fail, the immediate execution list process at step 705 is fail. Thus, the flow advances to step 711 shown in FIG. 7. At step 711, "fail" is set as the verified result. The merging process and cases of which fail takes place will be described later.

Thereafter, the flow advances to step 1004 through step 1002 or 1003. At step 1004, the merged point counter of the merged point snapshot of the next instruction is decremented by 1 (at step 1004). The value represents the number of instructions that are merged to the merged destination instruction and that have not been virtually executed. At step 1005, it is determined whether or not the value is 0. When the determined result at step 1005 is Yes, the flow advances to step 1006. At step 1006, it is determined whether or not the merged destination instruction is on the final verification list. When the determined result at step 1006 is Yes, the flow advances to step 1007. At step 1007, the merged destination instruction is finally verified. When the determined result at step 1006 is No, the offset of the merged destination instruction is added to the immediate execution list (at step 1008).

When the determined result at step 1005 is No, the flow advances to step 1009. At step 1009, it is determined whether or not the merged destination instruction is on the final verification list (at step 1009). When the determined result at step 1009 is No, the flow advances to step 1010. At step 1010, it is determined whether or not the merged destination instruction is on the waiting list. When the determined result at step 1010 is No, the offset of the merged destination instruction is added to the waiting list.

In the process, for each merged point instruction, it is determined whether or not all branch sources have been merged. When all branch sources have been merged (virtual execution states have been stored), a virtual execution is performed from the merged point as the immediate execution list process. After the process has been executed, an extra process is not required. When some of branch sources have not been merged (namely, virtual execution states to be merged have not been stored), a virtual execution is performed from the merged point as the waiting list process. After the process has been executed, the virtual execution states of the remaining branch sources are stored. After all branch sources have been merged, the final verification list process is performed.

Figure 11:
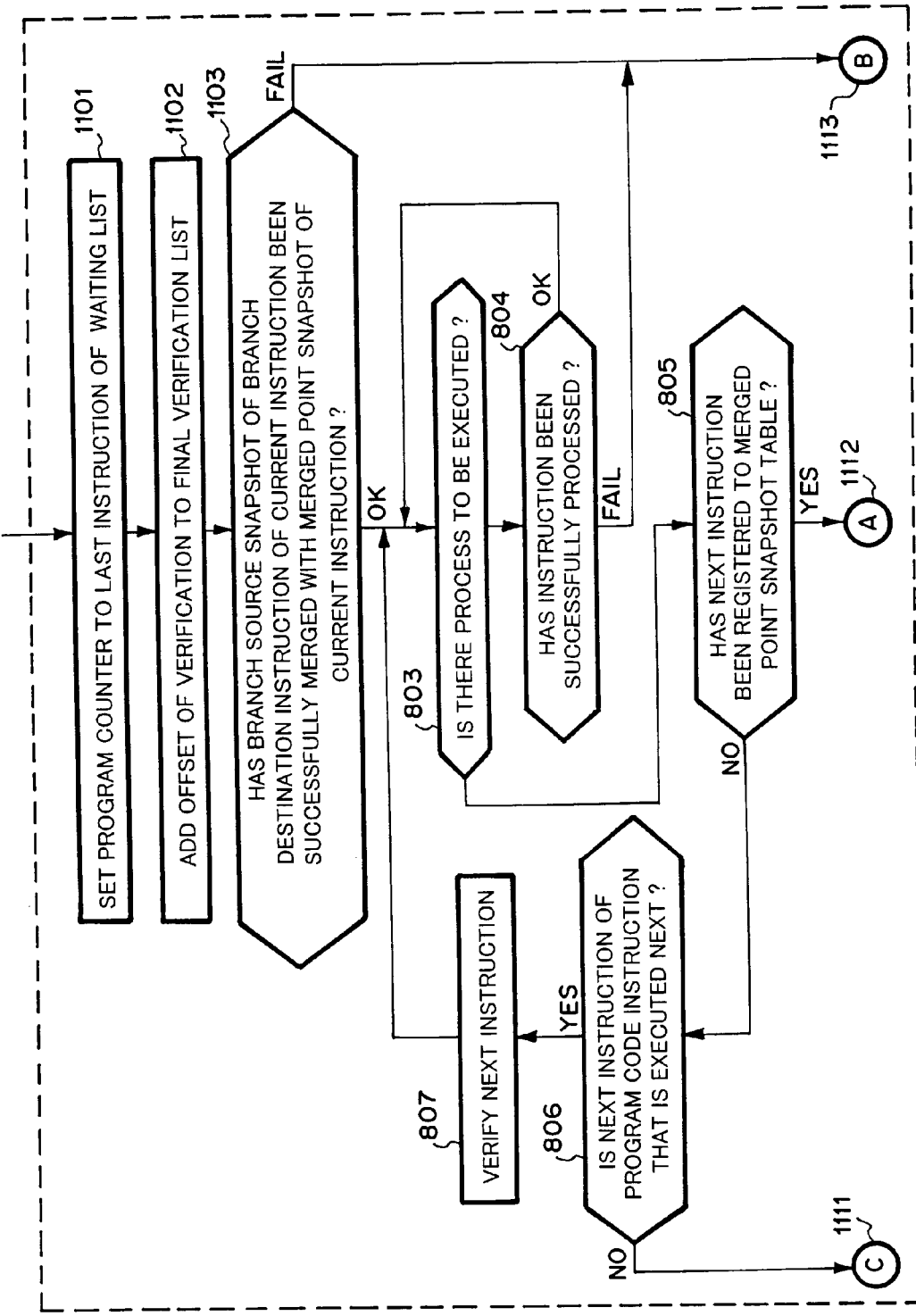
FIG. 11 is a flow chart showing the operation according to the first embodiment of the present invention.
Figure 12:
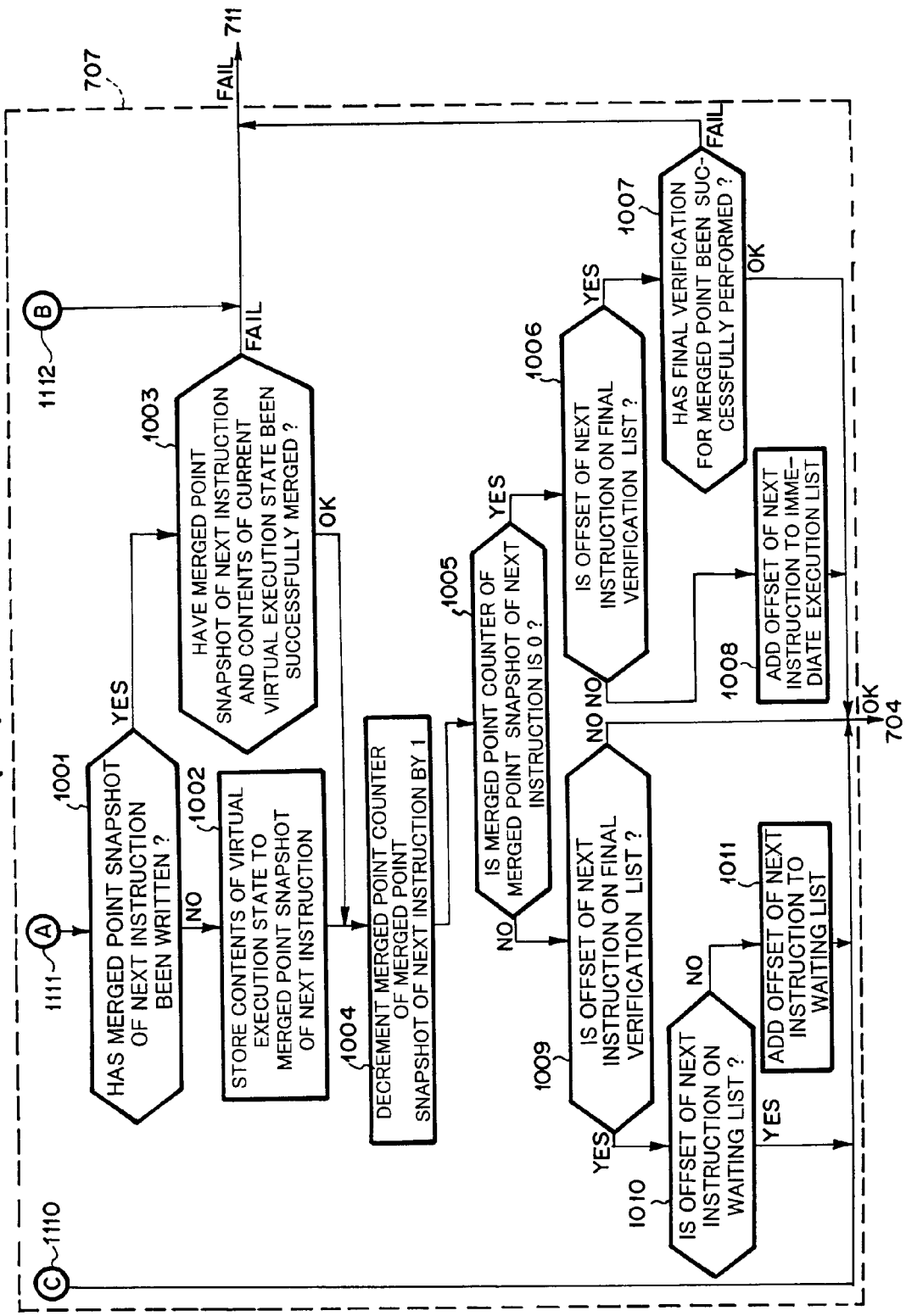
FIG. 12 is a flow chart showing the operation according to the first embodiment of the present invention.

FIGS. 11 and 12 are flow charts showing the process at step 707 shown in FIG. 7 (namely, the waiting list process). The operation of the process at step 707 is almost the same as the immediate execution list process at step 705. The process at step 705 is performed when the immediate execution list is empty (at step 704).

At step 1101, the program counter is set to the last instruction of the waiting list. One offset is extracted from the waiting list. The offset is added to the final verification list (at step 1102). At step 1103, a branch source snapshot whose virtual execution state has been stored is selected from those that are branch destinations of the offset. The virtual stack and the virtual local variable of the selected branch source snapshot are merged to the merged point snapshot corresponding to the extracted offset. The result is set to the virtual stack and the virtual local variable of the merged pint snapshot (at step 1103).

At this point, the virtual execution states of all branch sources have not been merged. On the assumption that the merged result is corrected in the final verification, the same virtual execution is started as with the immediate execution list process. Thereafter, the same process as the immediate execution list process 705 is performed at steps 803 to 807, 1001 to 1011, and 1111 to 1113.

Figure 13:
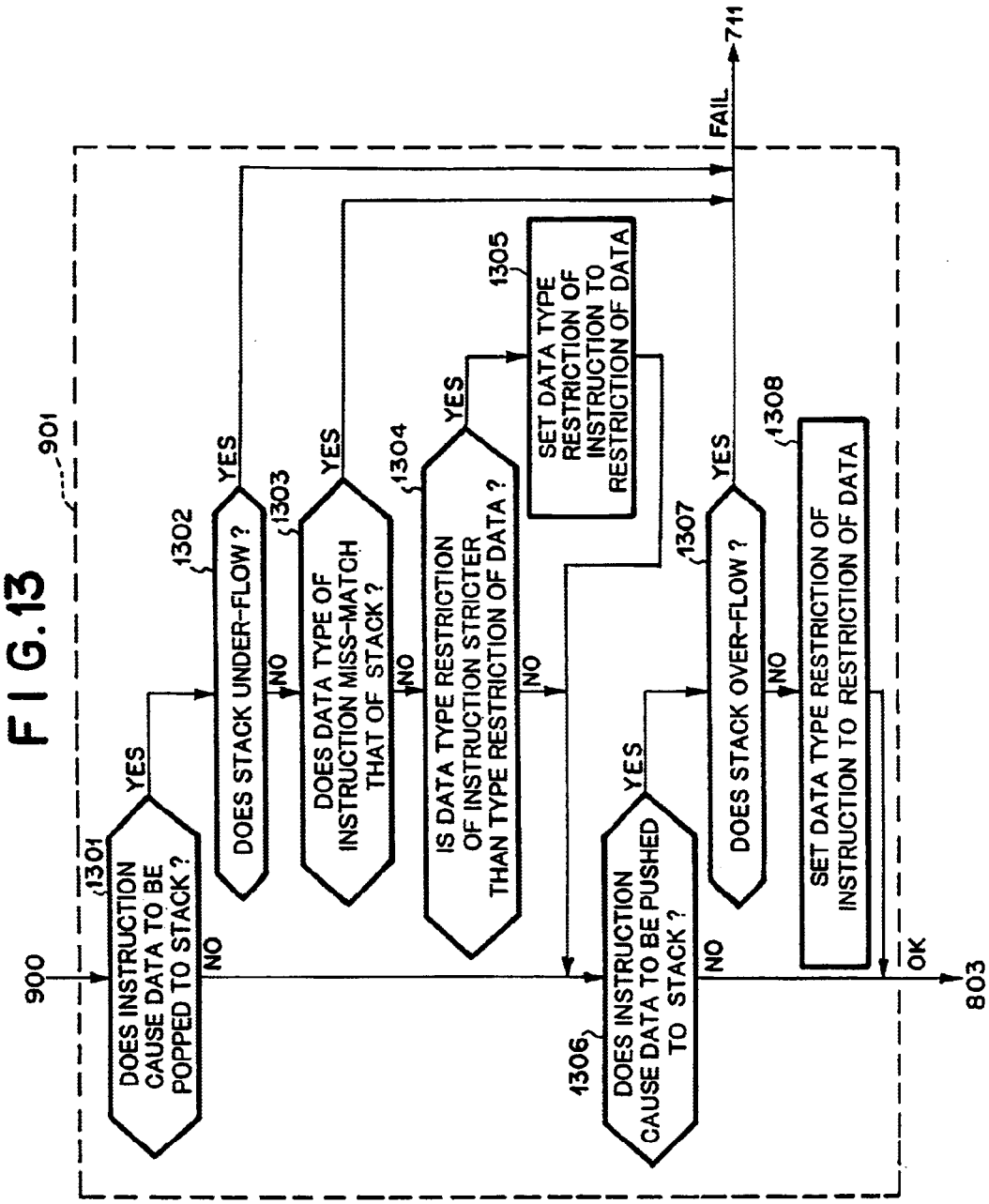
FIG. 13 is a flow chart showing the operation according to the first embodiment of the present invention.

FIG. 13 is a flow chart showing the process at step 901 shown in FIG. 9 (namely, the stack operation verifying process). In this process, it is determined whether the current instruction causes a data type variation, a stack overflow, and a stack underflow to take place in the stack operation.

At step 1301, it is determined whether or not the currently executed instruction in the virtual execution (at step 705) of the immediate execution list or in the virtual execution (at step 707) of the waiting list causes data to be popped from the stack.

When the determined result at step 1301 is Yes, the flow advances to step 1302. At step 1302, it is determined whether or not the value of the current stack counter is 0. When the determined result at step 1302 is Yes, since the stack under-flows, fail is returned. When the determined result at step 1302 is No, the flow advances to step 1303. At step 1303, it is determined whether or not the data restriction of the instruction matches the data type of the top portion of the current stack. Actually, the data pointer 26 has been stored in the virtual stack. Thus, the data restriction of the instruction is matched with the data structure 27 represented by the data pointer 26.

When the determined result at step 1303 is No, as a data type violation, fail is returned. When the determined result at step 1303 is Yes, the flow advances to step 1304. At step 1304, it is determined whether or not the data type restriction of the instruction is stricter than the data type restriction. When the determined result at step 1304 is Yes, the flow advances to step 1305. At step 1305, the data type restriction of the instruction is changed to the restriction of the data.

The data pointer is normally popped from the stack. The type restriction of the instruction is set as the data type restriction 272 of the data structure 27 represented by the popped data pointer. This restriction is set as a restriction after the data is generated until it is popped. It should be noted that the data pointer 26 is popped rather than the data structure 27.

Thereafter, the flow advances to step 1306. At step 1306, it is determined whether or not the currently executed instruction in the virtual execution causes data to be pushed to the stack.

When the determined result at step 1308 is Yes, the flow advances to step 1307. At step 1307, it is determined whether or not the value of the stack counter is equal to the maximum stack size. When the determined result at step 1307 is Yes, since the stack overflows, fail is returned. When the determined result at step 1308 is Yes, the data is normally pushed to the stack. The restriction type of the instruction is set as the type restriction 272 of the pushed data. As with the pop process, the data pointer 26 is pushed rather than the data structure 27.

Figure 14:
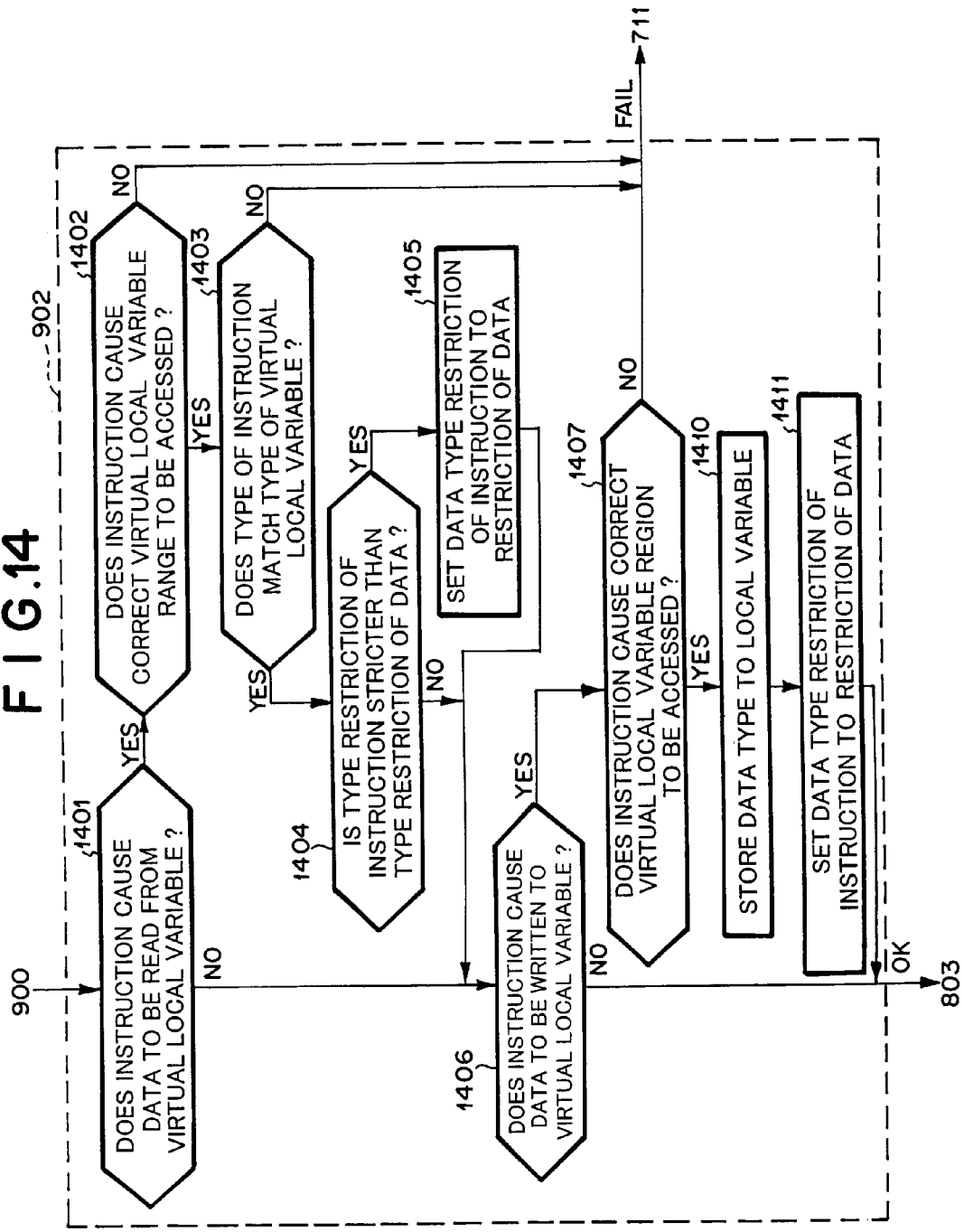
FIG. 14 is a flow chart showing the operation according to the first embodiment of the present invention.

FIG. 14 is a flow chart showing the process at step 902 shown in FIG. 9 (namely, the local variable operation verifying process). In this process, it is determined whether a data type violation takes place while the current instruction operates a local variable. Alternatively, it is determined whether the current instruction accesses the out-of the range of the local variable.

At step 1401, it is determined whether the currently executed instruction in the virtual execution of the immediate execution list (at step 705) or in the virtual execution of the waiting list (at step 707) reads data from a local variable.

When the determined result at step 1401 is Yes, the flow advances to step 1402. At step 1402, it is determined whether or not the local variable number of the local variable that has been read at step 1402 is between 0 to the maximum local variable number. When the determined result at step 1402 is No, fail is returned. Thereafter, the flow advances to step 711. At step 711, "false" is set as the verified result. When the determined result at step 1402 is Yes, the flow advances to step 1403. At step 1403, it is determined whether or not the data restriction of the instruction matches the data type of the designated local variable. When the determined result at step 1403 is No, fail is returned as a type restriction violation. Thereafter, the flow advances to step 711. At step 711, "false" is set as the verified result. When the determined result at step 1403 is Yes, the data pointer 26 of the local variable is normally read. Thereafter, the flow advances to step 1404. At step 1404, it is determined whether or not the type restriction of the instruction is stricter than the type restriction of the data represented by the data pointer. When the determined result at step 1406 is Yes, the type restriction of the instruction is set as the type restriction of the data structure 27 (at step 1405).

Thereafter, the flow advances to step 1406. At step 1406, it is determined whether or not the currently executed instruction in the virtual execution causes data to be written to a local variable.

When the determined result at step 1406 is Yes, the flow advances to step 1407. At step 1407, it is determined whether or not the local variable number is between 0 and the maximum local variable number. When the determined result at step 1407 is No, fail is returned. Thereafter, the flow advances to step 711. At step 711, "false" is set as the verified result. When the determined result at step 1407 is Yes, the flow advances to step 1410. At step 1410, the data pointer 26 is normally written to the variable. Thereafter, the flow advances to step 1411. At step 1411, the type restriction of the instruction is set as the type restriction of the data structure 27 represented by the data pointer.

Figure 15:
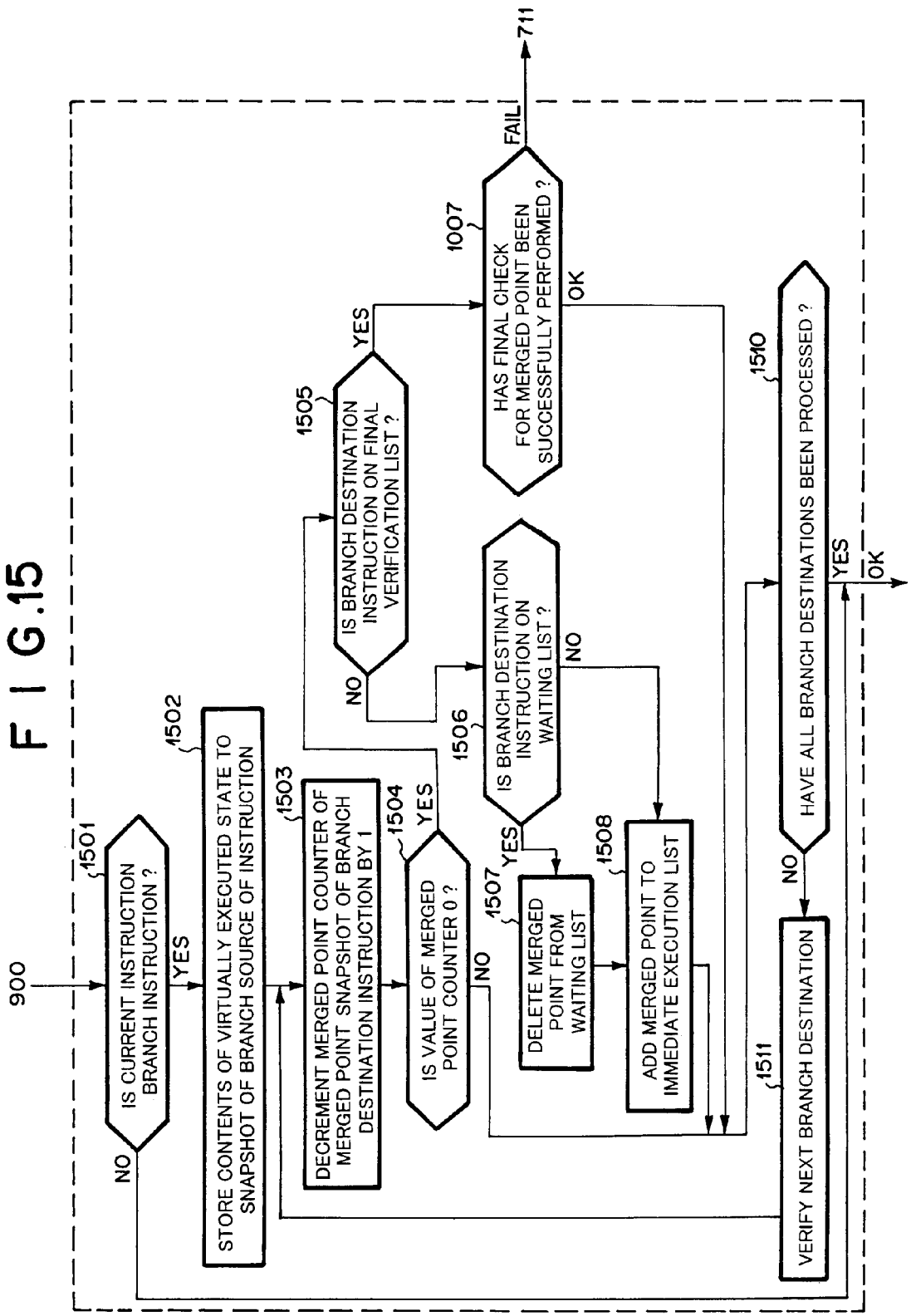
FIG. 15 is a flow chart showing the operation according to the first embodiment of the present invention.

FIG. 15 is a flow chart showing the process at step 805 shown in FIG. 8 (namely, the branch instruction verifying process). When a branch instruction is detected, the current virtual execution state is stored to a branch source snapshot corresponding to the instruction. In addition, a merged point snapshot of the branch destination of the instruction is processed.

At step 1501, it is determined whether or not the currently virtually executed instruction is a branch instruction. When the determined result at step 1501 is Yes, the flow advances to step 1502. At step 1502, the current virtual execution state is stored to a branch source snapshot of the instruction. Thereafter, for each branch destination, the following process is performed.

At step 1503, the merged point counter of the merged point snapshot of the branch destination instruction is decremented by 1. Thereafter, the flow advances to step 1504. At step 1504, it is determined whether or not the value of the merged point counter is 0. When the determined result at step 1504 is No, the process is terminated. Thereafter, the flow advances to step 1510. At step 1510, the next branch destination is verified. When the determined result at step 1504 is Yes, the flow advances to step 1505. At step 1505, it is determined whether or not the branch destination instruction is on the final verification list. When the determined result at step 1505 is Yes, the flow advances to step 1007. At step 1507, the offset is extracted and finally verified. When the determined result at step 1505 is No, the flow advances to step 1506. At step 1506, it is determined whether or not the branch destination instruction is on the waiting list. When the determined result at step 1506 is Yes, the flow advances to step 1507. At step 1507, the branch destination instruction is deleted from the waiting list. Thereafter, the flow advances to step 1508. At step 1508, the offset of the branch destination instruction is added to the immediate execution list.

Whenever a branch instruction is detected, the merged point snapshot of each branch destination instruction is updated (at step 1511). It is determined whether or not virtually executed states of all branch sources have been stored corresponding to the merged point counter (at step 1510).

Figure 17:
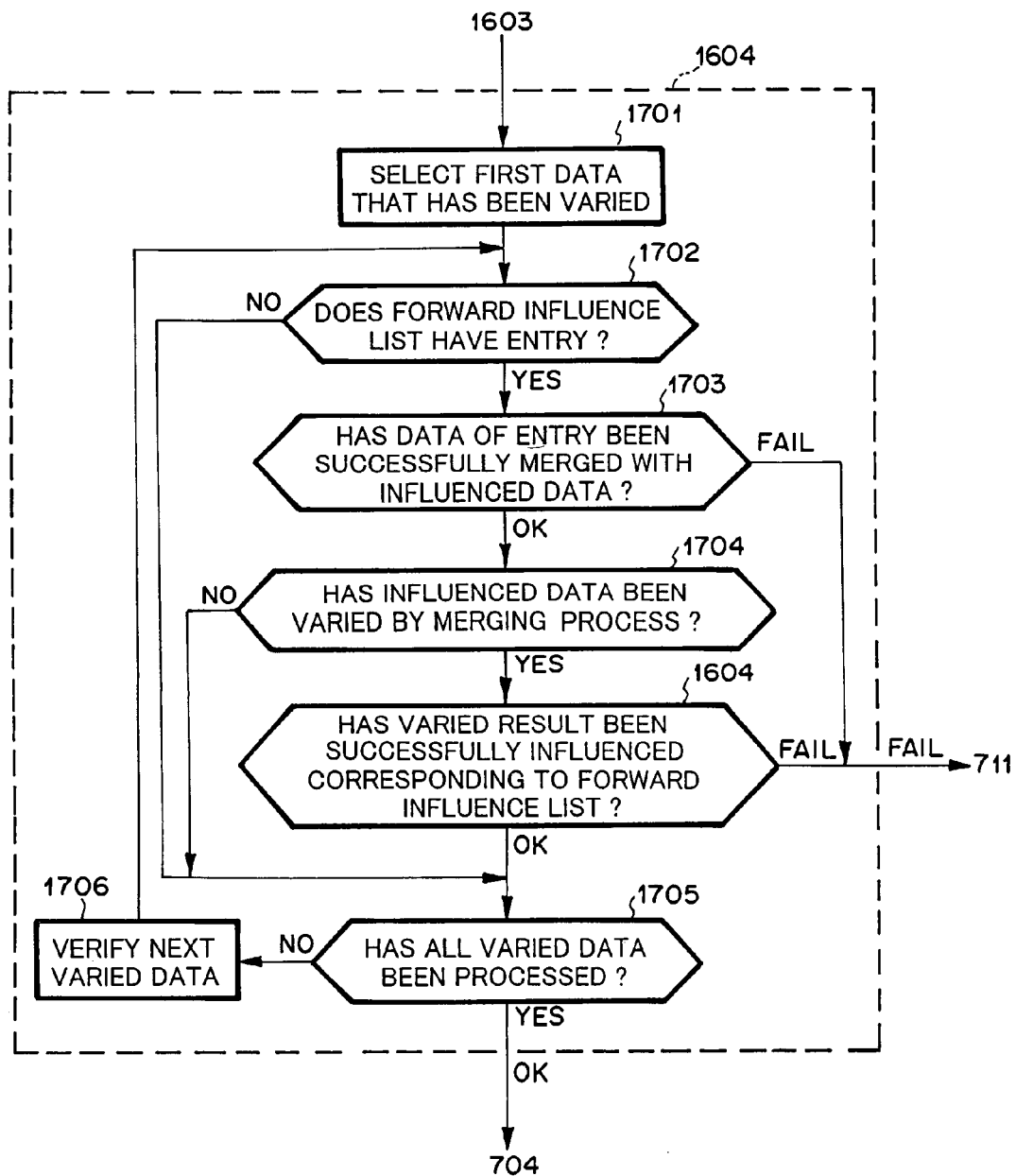
FIG. 17 is a flow chart showing the operation according to the first embodiment of the present invention.

FIGS. 16A, 16B, and 17 are flow charts showing the process at step 709 shown in FIG. 7 (namely, the final verification list process). Unlike with the immediate execution list process at step 705 and the waiting list process at step 707, in the final verification list process 709, a program code is not virtually executed. In the final verification list process at step 709, at a particular merged point, in the case that the immediate execution list is empty (at step 704), the waiting list is empty (at step 706), and the final verification list is not empty (at step 708), when a program code is virtually executed as the waiting list process before virtually executed states of all branch sources are stored, after virtual execution states of all branch sources are stored, a consistency is determined without need to virtually execute the program code.

In FIG. 16A, the verifier 108 extracts one offset from the final verification list at step 1601. Thereafter, the verifier 108 finally verifies the merged point snapshot of the merged point represented by the offset (at step 1007).

In FIG. 16, the final verification is performed at three steps. At step 1602, virtual stacks, virtual local variables, and stack counters of all branch source snapshots of branch sources are merged as a virtual stack, a virtual local variable, and a stack counter of the merged point. Thereafter, the flow advances to step 1603. At step 1603, it is determined whether or not the virtual execution state varies from the pre-merged virtual execution state. When the determined result at step 1603 is No, the final verification list process is normally terminated. When the determined result at step 1603 is Yes, the flow advances to step 1604. At step 1604, the varied data is reflected to relevant data corresponding to a forward influence list.

FIG. 17 is a flow chart showing the process at step 1604 shown in FIG. 16. At step 1701, first data that has been varied is selected. Thereafter, the flow advances to step 1702. At step 1702, it is determined whether or not the forward influence list of the data has an entry. When the determined result at step 1702 is No, the flow advances to step 1705. At step 1705, the next data of the varied data is verified. When the determined result at step 1702 is Yes, the flow advances to step 1703. At step 1703, it is determined whether or not the data of the entry and the affected data have been successfully merged. When the determined result at step 1703 is fail (namely, the merged data is inconsistent), fail is returned in the final verification list process. Thereafter, the flow advances to step 711. At step 711, "false" is set as the verified result.

When the determined result at step 1704 is Yes, the influenced data is finally verified. In other words, the process at step 1604 is recursively performed for the data until the merged influenced data does not vary.

When the process for all varied data is completed, the final verification list process is normally terminated. Thereafter, the flow advances to step 44 shown in FIG. 4. When fail is returned in the process shown in FIG. 17, fail is returned in the final verification process.

Figure 18:
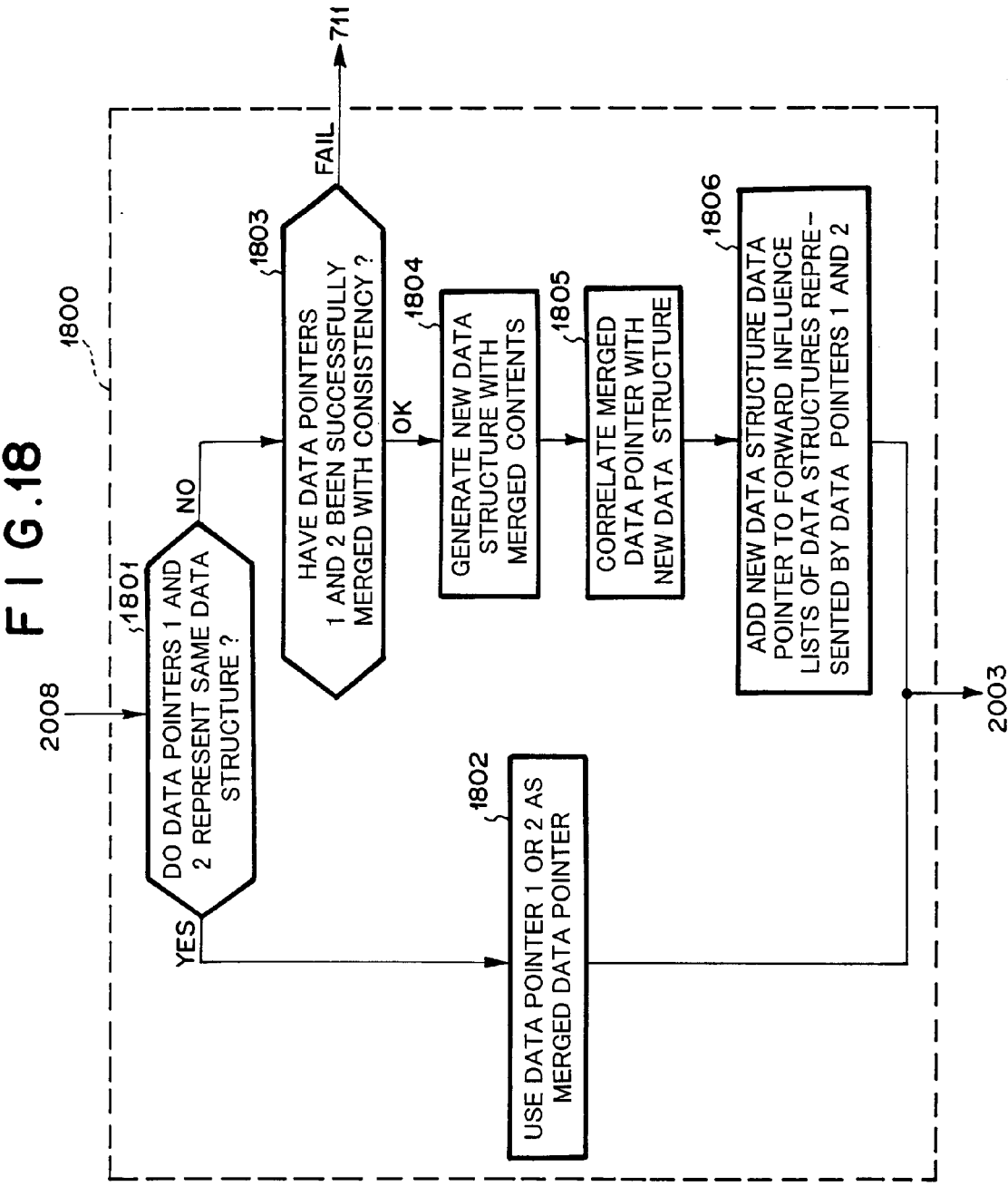
FIG. 18 is a flow chart showing the operation according to the first embodiment of the present invention.
Figure 19:
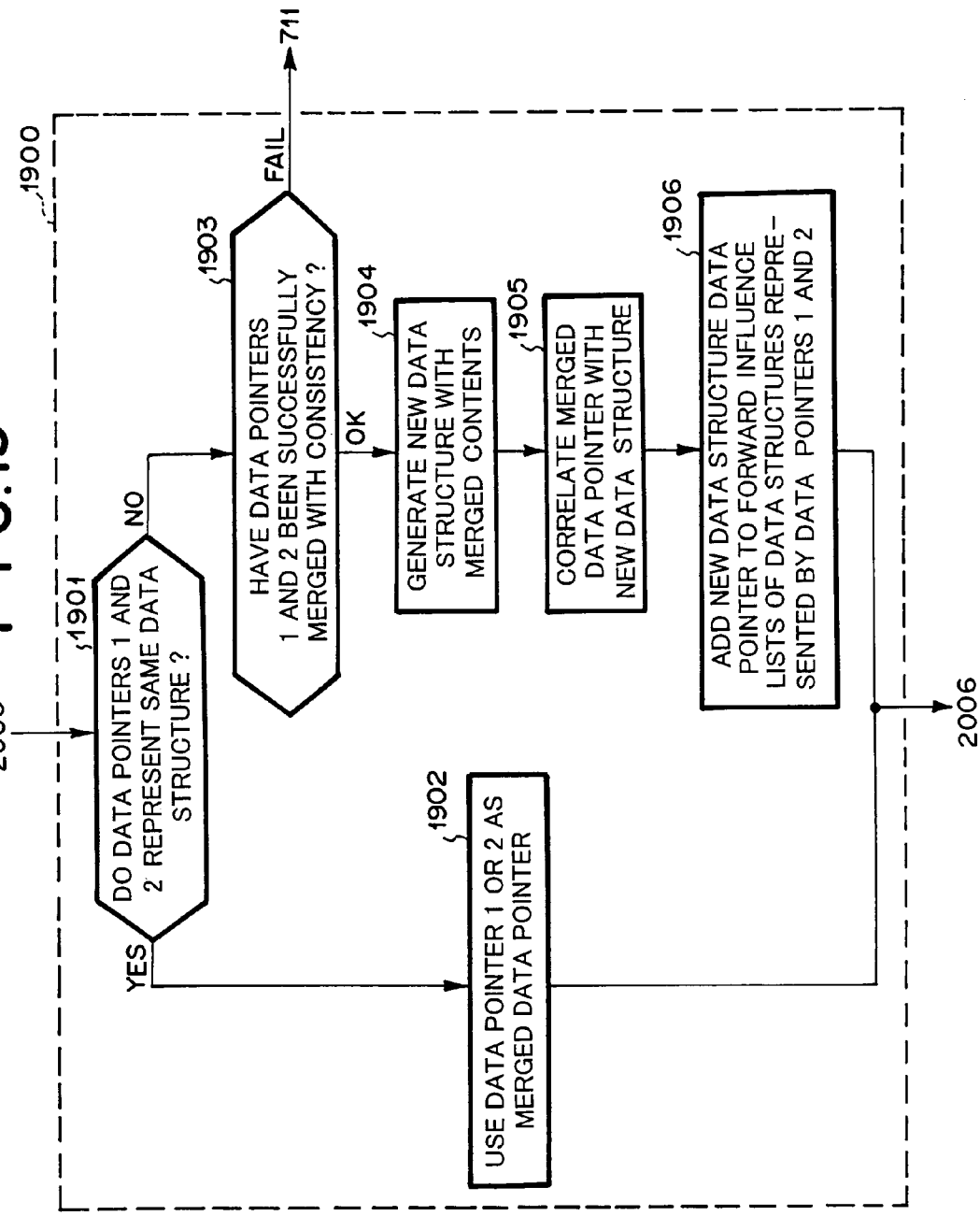
FIG. 19 is a flow chart showing the operation according to the first embodiment of the present invention.
Figure 20:
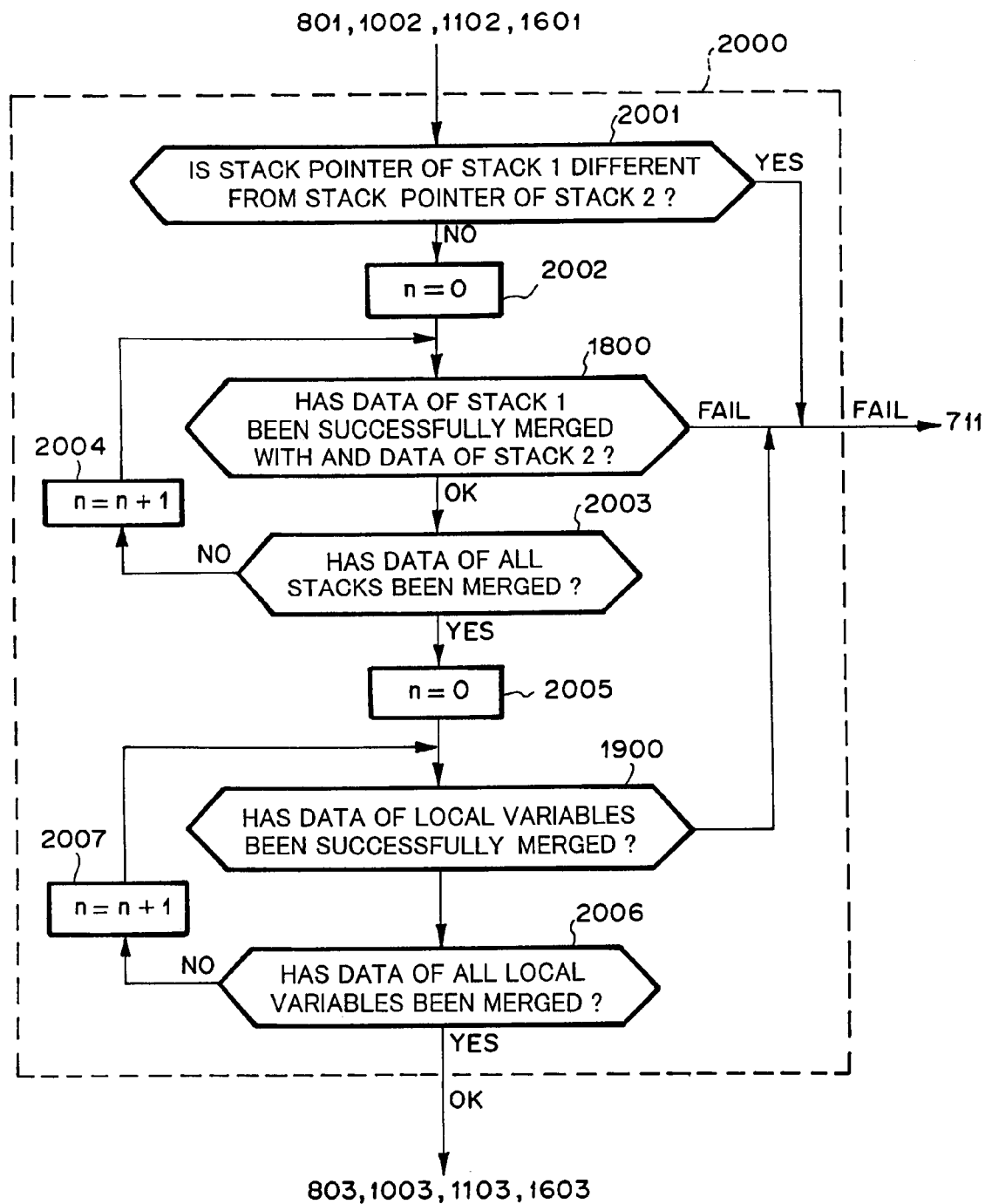
FIG. 20 is a flow chart showing the operation according to the first embodiment of the present invention.

FIGS. 18, 19, and 20 are flow charts showing a process for merging a virtual stack and a virtual local variable. The processes at step 802 (shown in FIG. 8), at step 1003 (shown in FIG. 10), at step 1103 (shown in FIG. 11), at step 1003 (shown in FIG. 12), and at step 1602 (shown in FIG. 16) are performed in the process shown in FIG. 20.

FIG. 20 is a flow chart showing an overall process for merging a virtual stack and a virtual local variable.

At step 2001, it is determined whether or not stack pointers of virtual stacks to be merged are at the same position. When the determined result at step 2001 is No, fail is returned in the merging process at step 2000. Thereafter, the flow advances to step 711. At step 711, "false" is set as the verified result.

Thereafter, as shown in FIG. 18, the data merging process at step 1800 is performed for each data pointer of each virtual stack. All data is merged from the beginning of each stack to the position of the stack pointer. When fail is returned, fail is returned in the merging process at step 2000. Thereafter, the flow advances to step 711. At step 711, "false" is set as the verified result.

Likewise, as shown in FIG. 19, the data merging process 1900 is performed for all data pointers of virtual local variables.

FIG. 18 is a flow chart showing a process for merging data pointers of virtual stacks. At step 1801, it is determined whether or not each data pointer represents the same data structure. When the determined result at step 1801 is Yes, the flow advances to step 1802. At step 1802, the merged data pointer is used as the new data pointer. When the determined result at step 1801 is No, the flow advances to step 1803. At step 1803, the data structures of two data pointers are checked and it is determined whether or not the two pointers can be merged. When the determined result at step 1803 is No, fail is returned in the process at step 1800. Thereafter, the flow advances to step 711. At step 711, "false" is set as the verified result. When the determined result at step 1803 is Yes, the flow advances to step 1804. At step 1804, the two pointers are merged and thereby a new data structure is generated. Thereafter, the merged data pointer is correlated with the new data structure (at step 1805). In addition, the new data structure is added to forward influence lists of data structures represented by the pre-merged data pointers (at step 1806).

Figure 21:
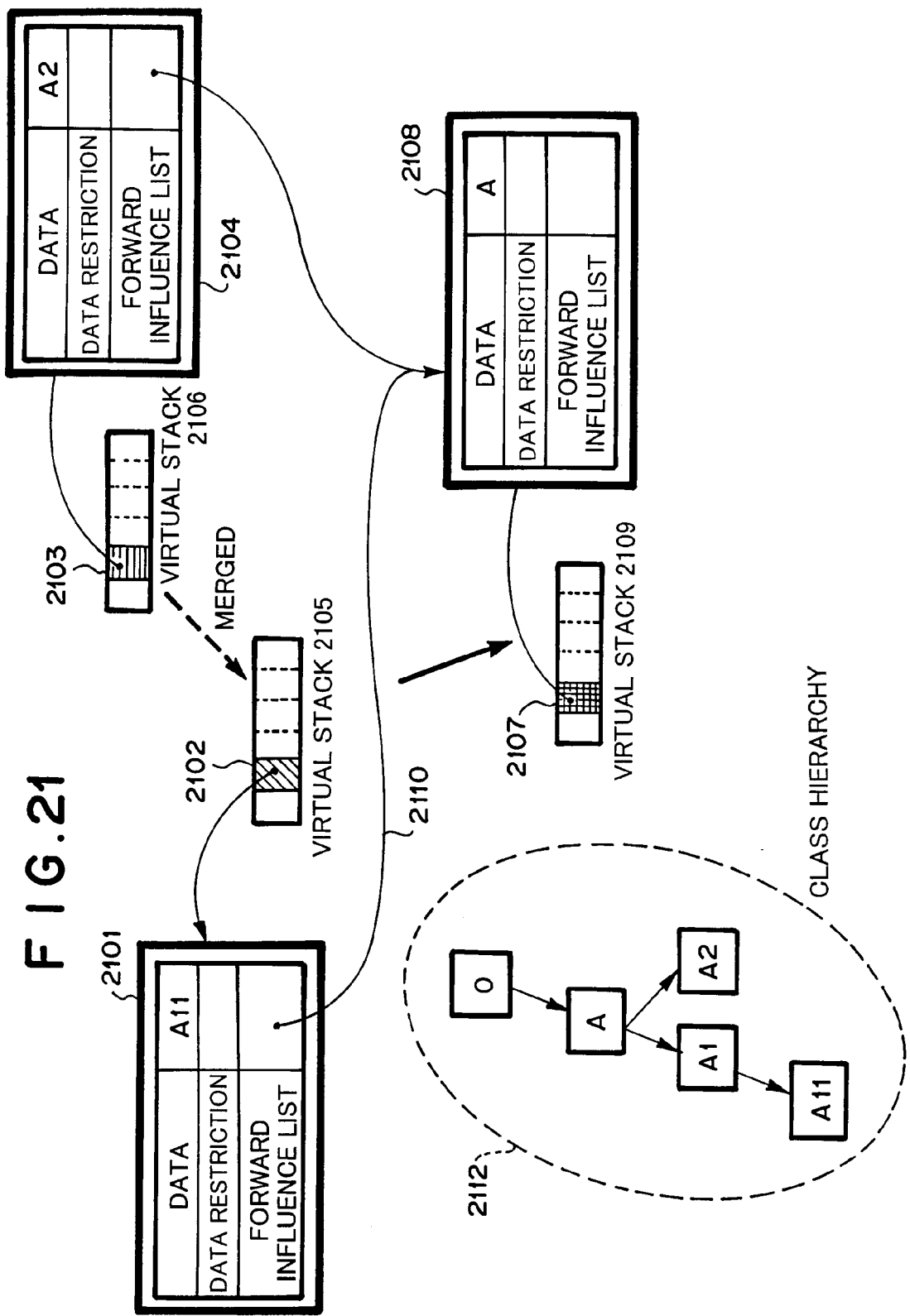
FIG. 21 is a flow chart showing the operation according to the first embodiment of the present invention.

FIG. 21 is a schematic diagram showing a process for merging values of different data structures of two data pointers of an object oriented program having a class hierarchy. In FIG. 21, reference numeral 2112 shows a class hierarchy. The class hierarchy has classes O, A, A1, A2, and A11 of O→A→A1, A→A2 and A1→A11.

In FIG. 21, a data pointer 2102 represents a data structure 2101. A data pointer 2103 represents a data structure 2104. When the data pointers 2102 and 2103 are merged, a new data structure 2108 is generated. The merged data pointer 2107 represents the new data structure 2108. At this point, the data pointers 2110 and 2111 to the data structure 2108 are added to the forward influence lists of the data structures 2101 and 2104. When data of the data structure is changed, the data structure in the forward influence list should be changed.

Figure 22:
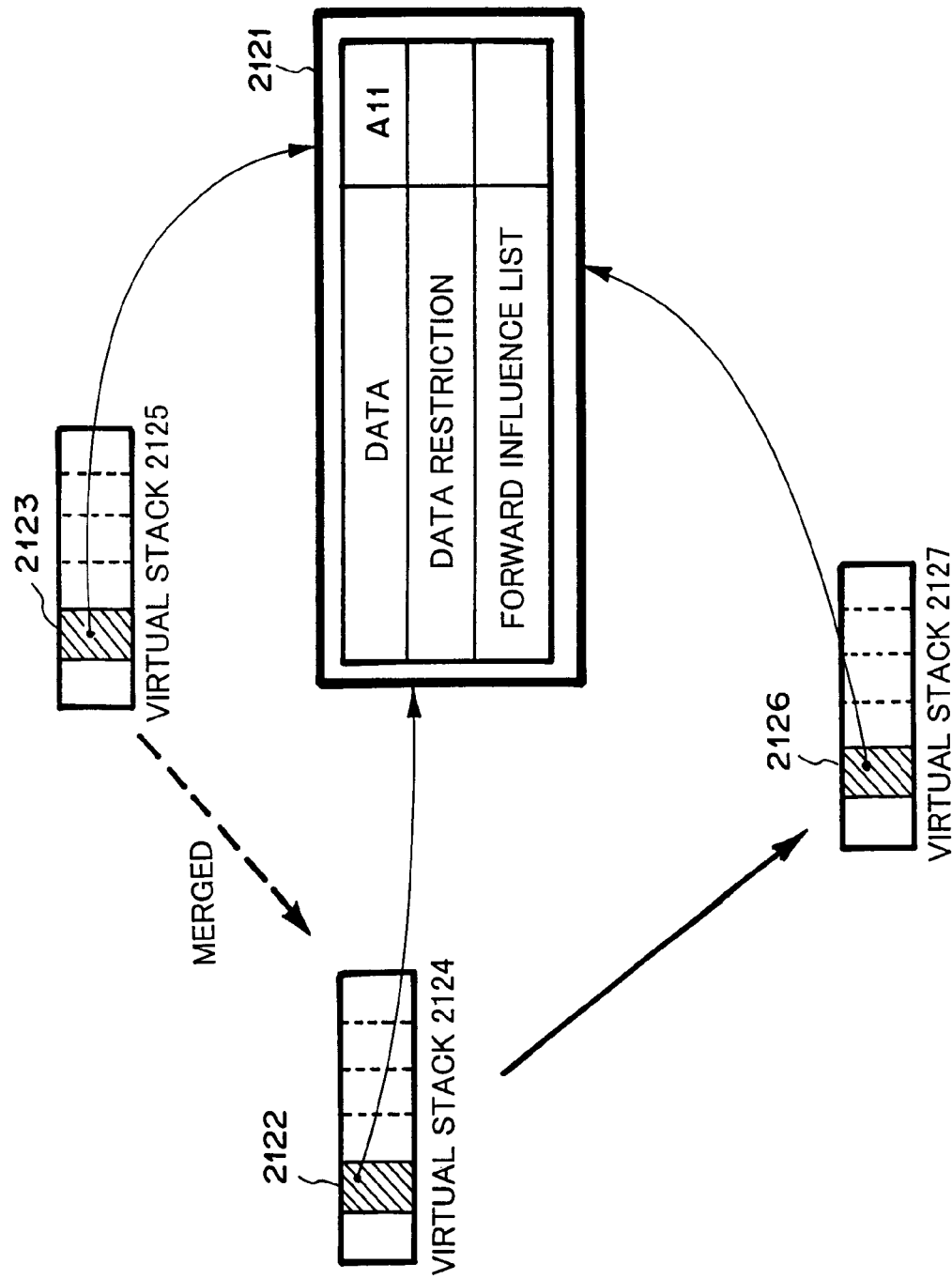
FIG. 22 is a flow chart showing the operation according to the first embodiment of the present invention.

FIG. 22 is a schematic diagram showing a process for merging two data pointers that represent the same data structure. In FIG. 22, data pointers 2122 and 2123 corresponding to virtual stacks 2124 and 2125 represent the same data structure 2121. When both the data pointers are merged, a new data structure is not generated. A data pointer 2126 corresponding to a virtual stack 2127 of the merged data pointers represents the same data structure 2121. Thus, the forward influence list generating process (at steps 1804, 1805, and 1806 in FIG. 18) and the change reflecting process (at step 1604 in FIG. 16) of the final verifying process at step 1007 can be omitted. In addition, the data effective range can be clarified.

Figure 23:
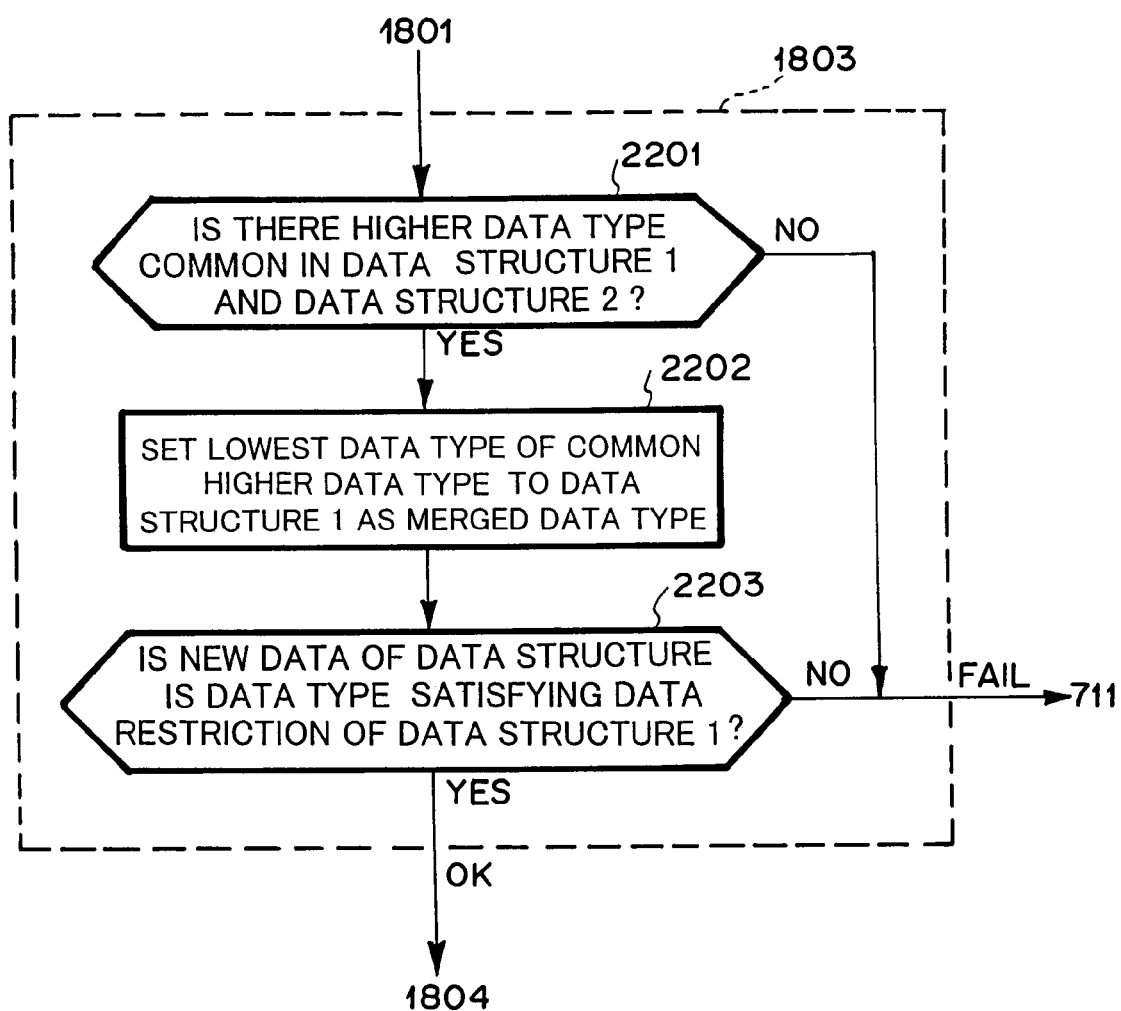
FIG. 23 is a flow chart showing the operation according to the first embodiment of the present invention.

FIG. 23 is a flow chart showing the merging process at step 1803. In the merging process at step 1803, data 1 and data 2 are merged in a virtual stack. The merged result is reflected to the data 1. At step 2201, it is determined whether or not there is a higher data type common in the data 1 and the data 2. When the determined result at step 2201 is No, fail is returned in the process at step 1803.

When the determined result at step 2201 is Yes, the flow advances to step 2202. At step 2202, the lowest data type is selected the common higher data types and set to the data 1. Thereafter, the flow advances to step 2203. At step 2203, it is determined whether or not the rewritten data 1 satisfies the data restriction of the data 1. When the determined result at step 2203 is No, fail is returned in the process at step 1803. This merging process assures that when particular data has a restriction condition that will be decided later, all data merged thereto satisfies the restriction.

For example, when particular data is used as A type, the data has a restriction of "lower than A type". Thereafter, data merged to the particular data should be data of at least A type or higher (used as A type). When the common higher data type of merged data and original data is higher than A type (namely, the data types of both data are lower than A type), since a portion of the program that is used as A type cannot be executed, the execution of the program is stopped.

Figure 24:
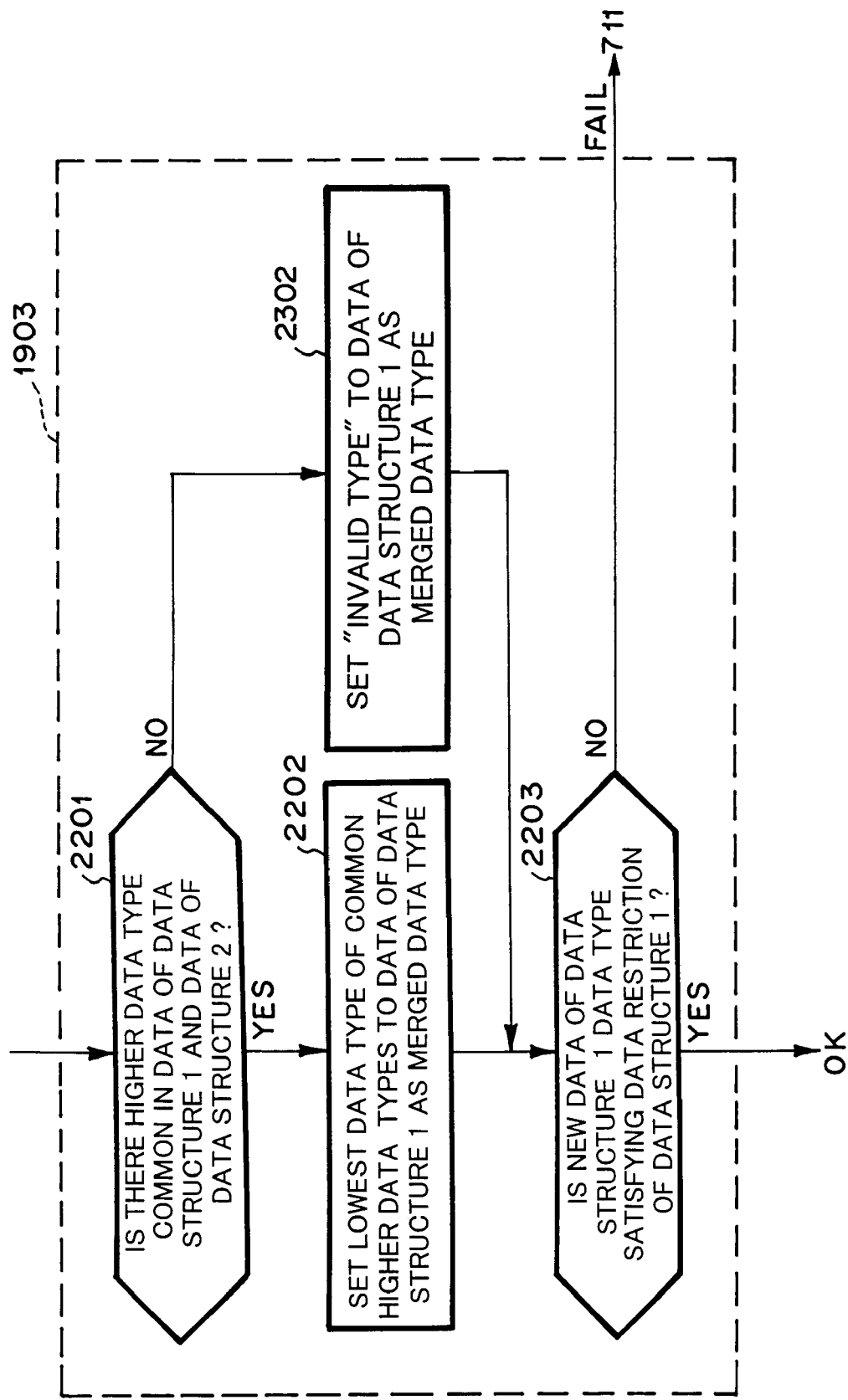
FIG. 24 is a flow chart showing the operation according to the first embodiment of the present invention.

FIG. 24 is a flow chart showing the process at step 1903 shown in FIG. 19. At step 1903, data 1 and data 2 are merged. The merged result is reflected to the data 1. The same process at step 2201 shown in FIG. 23 is performed. When the determined result at step 2201 is No, the flow advances to step 2302. At step 2302, "invalid type" is set to the data. The "invalid type" is the highest type of which when data of "invalid type" is merged with data of any type, the resultant data becomes "invalid type". The data positon is prohibited from being read in the program. In other words, in the process for reading data from a local variable, since the data type of data to be read is set to the restriction of the data, when the restriction is set, the "invalid type" does not satisfy it, fail is returned in the process. The other processes are performed as with those shown in FIG. 23. Thus, virtual local variables have been merged.

FIG. 27 is a schematic diagram showing a data merging process in an object oriented language such as Java having a class hierarchy. In FIG. 27, reference numeral 2611 represents a Java class hierarchy having classes of O→A→A1, A→A2 and A1→A11. In FIG. 27, each arrow represents a transition from a parent class to a child class. In the class hierarchy 2611, the highest class is O type. A child class of the O type class is A type. Child classes of the A type class are A1 type and A2 type. A child class of the A1 type class is A11 type class. A program 2600 has a branch of which an instruction 2605 returns to an instruction 2602.

It is assumed that the program 2600 is virtually executed from the beginning. The instruction 2601 causes data of A11 type to be generated in a virtual stack. A pointer of the data of A11 type stored in the virtual stack is also written to a data pointer of a merged destination snapshot of an instruction 2602. When data of an instruction 2603 is of A1 type, A1 type is set as the data restriction of data 2607. Thus, in the instruction 2602, data that does not satisfy the restriction of A1 type cannot be merged.

When an instruction 2604 causes data of A2 type to be overwritten at the same stack position as the instruction 2601, the next branch instruction 2605 causes the contents of the virtual stack 2608 to be merged to the virtual stack 2602. At this point, the data 1 is a higher class of A11 type of the instruction 2606 and A2 type of the instruction 2608. In the class hierarchy 2611, the data type of the data 1 is A type. Thus, the data type of the data structure 2607 is changed to A type as data 2610 as shown in the lower part of FIG. 27. At this point, since A type does not satisfy the restriction of A1 type, fail is returned in the merging process.

The merging process and the program verifying system therewith are not limited to the above-described Java language. In other words, the present invention can be applied to any program language whose instructions have data types in a hierarchical relation.

Each data has a data type restriction. In addition, data that does not satisfy such a restriction is prohibited from being merged. Thus, when a data type is varied, it is not necessary to verify the varied portion unlike with the second conventional method. Consequently, the verifying process can be quickly performed.

Each step of the program verifying method can be stored as a program on a storage medium from which a computer can read the program. For example, in FIG. 1, programs for verifying the program codes 107 and 117 are stored in the temporary storing units 103 and 113 of the computers 10 and 11, respectively. The temporary storing units 103 and 113 may be semiconductor storing devices, hard disks, floppy disks, MDs, CD-ROMs, or CD-Rs. Alternatively, the temporarily storing units 103 and 113 may be the main storing units of the computers 10 and 11.

[Second Embodiment]

Next, a second embodiment of the present invention will be described.

The second embodiment of the present invention is in that the first embodiment is applied to a program language that does not use a stack.

It is convenient to use a stack that stores the execution state of a program code. However, the use of the stack does not relate to the basic feature of the present invention at all. In a program language of which stacks, local variables, and so forth are totally managed and a program is executed using a conventional storing area that is not affected by the reading order, the "stack snapshots" of the first embodiment are changed to those of a desired storage area. Thus, any storing format can be used.

For example, in a conventional compiler language of which a memory is used as a storing portion and of which only a high speed accessing portion or calculating portion is stored in a register, the required storage area is snapped. Thus, a program code can be verified as with the first embodiment. In addition, the program code can be quickly verified.

[Third Embodiment]

Next, a third embodiment of the present invention will be described. According to the third embodiment of the present invention, when an area of which each data is used in a program code is restricted in the same manner as the first embodiment, the storage area can be more effectively unallocated.

In the first embodiment, since the entire program code is verified, it is easy to know at what program position each data has been generated and used. In addition, it is easy to know what data is overwritten with what data.

FIG. 28 is a schematic diagram showing a data existence period. A data structure 2708 generated by an instruction 2701 of a program 2700 is used by instructions 2702 to 2705. However, in the second conventional method, although the data is not used for the instruction 2705 and the later instructions, the data is overwritten with another data. Until it is explicitly determined that the data is not required in the instruction 2706, the storage area of the data structure 2708 cannot be unallocated.

In the first embodiment of the present invention, since an area for each data can be easily detected, when the program is really executed, after the instruction 2705 is completed, information that allows the storage area of the data to be unallocated can be issued. Thus, the data storing efficiency of the real execution of the program can be improved.

[Fourth Embodiment]

According to a fourth embodiment of the present invention, in a system based on the first embodiment, the type information of each data is omitted so as to improve the execution efficiency of a program and the efficiency of the storage area. At this point, the type information is restored in such a manner that data access is not limited to the real execution.

According to the first embodiment, since a program code is virtually verified, the verifying process is omitted in the real execution. Thus, the execution speed of the program code can be improved. In addition, since data type information is omitted, the data storage efficiency can be improved. In contrast, when a process other than the execution sequence of the program code is executed, since the data type information is lost, the program code cannot be accessed.

For example, when a garbage collection process that independently operates from the execution system of the program code verifies a data state in the real execution of a program code, the program code may be accessed with data whose type information is lost.

According to the fourth embodiment of the present invention, by applying the first embodiment, lost type information can be dynamically restored. In other words, when the data type of data at a particular point of a program code is required, the program code is virtually verified from the beginning to the desired point according to the first embodiment. Thus, the type information of data at the point can be dynamically obtained.

To quickly verify a program code, corresponding to the method of the first embodiment, the type information of data at several points of the program code is cached. Thus, when the verifying method according to the fourth embodiment is accomplished, the restoring process is started from a cached position closest to a particular position that requires type information. Thus, the type information can be restored with a very small number of steps.

The fourth embodiment of the present invention is in that a program code can be verified from any position corresponding to the method according to the first embodiment.

A first effect of the present invention is in that when a program code described with a primitive machine instruction set having instructions that permit a plurality of data types as a restriction range is virtually verified, only one virtual verifying process is required. Thus, the process speed is improved. In other words, when the verifying process is virtually performed, the strictest restriction of data used in the program code is stored. Thus, when the verifying process is preformed next time, only a conformance verifying process against the restriction condition is performed. When data is changed, since the data is reflected to relevant data in the forward direction, all restriction conditions of the data can be checked.

A second effect of the present invention is in that since the effective range of each data is designated and the data storage time in the real execution of a program is minimized, data that is not used can be unallocated for other data. In other words, when a program code is virtually verified, since the same data is processed with the same data pointer, the storage area can be unallocated in consideration of the final use position of the real execution of the verifying process.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A program verifying system for virtually verifying a program code described as a program instruction set having instructions with data type restrictions so as to determine whether or not the restrictions are correctly satisfied before executing step, comprising:

data type inferring means for designating a lower limit type permissible as type information for various data types as virtually verified results and an upper limit type corresponding to the use of the data so as to infer the range of the type of each data;

merging means for merging data at a merged point of a plurality of paths due to a branch instruction in the program code and setting a common portion of the data as new data;

forward reflecting means for reflecting the change of the data to the other data that is influenced by the change of the data when the data is changed by said merging means;

forward correlating means for correlating original data and the data changed by said merging means so as to allow said forward reflecting means to select data to be reflected; and determining means in which include in said data type inferring means for prohibiting the program code from being really executed when said data type inferring means detects a portion that violates the type restriction in the verified program code.

2. The program verifying system as set forth in claim 1, wherein merging means is branch pre-processing means for detecting a branch instruction in the program code and storing the branch source, the relation therewith, and the number of branches, the process of said branch pre-processing means being performed before the program code is virtually verified, and wherein said merging means has branch process connecting means for referring branch number information obtained by said branch pre-processing means and subtracting the branch source that has been merged from the branch number information so as to assure that the data restriction of the merging process of all branch sources is not violated.

3. The program verifying system as set forth in claim 2, wherein said merging means has same data merging determining means for unifying data without generating new data when two data to be merged has the same data structure.

4. The program verifying system as set forth in claim 1, wherein said merging means has same data merging determining means for unifying data without generating new data when two data to be merged has the same data structure.

5. A storage area managing system using a system for virtually executing a program code before really executing the program code, the storage area managing system comprising:

virtual executing means for verifying only a data type restriction of the program code before really executing the program code;

data valid range deciding means for deciding the final use position of each data and storing it during the process of said virtual executing means; and storage area unallocating means for unallocating a storage area for data that exceeds the data valid range corresponding to the data validity range information designated by said data valid range deciding means during the real execution of the program code.

6. The external storage area referencing and managing system as set forth in claim 5, wherein said virtual executing means has:

type information caching means for caching data type information of at least one position of the program code before the real execution and after the completion of the virtual execution, and wherein said type information restoring means has:

second type information restoring means for restoring desired data type information corresponding to data type information at a program position closest to the desired data position.

7. An external storage area referencing and managing system for allowing a particular process other than a real execution of a program code to reference data in a system for verifying that the restriction of type information of the program code is not violated so as to omit the type information process in the real execution of the program code, the external storage area reference managing system comprising:

virtual executing means for virtually executing the program code from the beginning to the currently executed point corresponding to the currently executed point in the real execution of the program code and corresponding to the data position information to which the particular process references; and type information restoring means for restoring the data type information to which said virtual executing means references.

8. A program verifying method for virtually verifying a program code described as a program instruction set having instructions with data type restrictions so as to determine whether or not the restrictions are correctly satisfied, comprising the steps of:

(a) designating a lower limit type permissible as type information for various data types as virtually verified results and un upper limit type corresponding to the use of the data so as to infer the range of the type of each data;

(b) merging data at a merged point of a plurality of paths due to a branch instruction in the program code and setting a common portion of the data as new data;

(c) reflecting the change of the data to the other data that is influenced by the change of the data when the data is changed at step (b);

(d) correlating original data and the data changed at step (b) so as to allow data to be reflected to be selected at step (c); and (e) prohibiting the program code from being really executed when a portion that violates the type restriction in the verified program code is detected at step (a).

9. The program verifying method as set forth in claim 8, wherein step (b) is performed by (f) detecting a branch instruction in the program code and storing the branch source, the relation therewith, and the number of branches, the process at step (f) being performed before the program code is virtually verified, and wherein step (b) has the step of:

(g) referring branch number information obtained at step (f) and subtracting the branch source that has been merged from the branch number information so as to assure that the data restriction of the merging process of all branch sources is not violated.

10. The program verifying method as set forth in claim 9, wherein step (b) has the step of:

(h) unifying data without generating new data when two data to be merged has the same data structure.

11. The program verifying method as set forth in claim 8, wherein step (b) has the step of:

(h) unifying data without generating new data when two data to be merged has the same data structure.

12. A storage area managing method using a system for virtually executing a program code before really executing the program code, the method comprising the steps of:

(i) verifying only a data type restriction of the program code before really executing the program code;

(j) deciding the final use position of each data and storing it at step (i); and (k) unallocating a storage area for data that exceeds the data valid range corresponding to the data validity range information designated at step (j) during the real execution of the program code.

13. An external storage area referencing and managing method comprising the steps of:

(l) allowing a particular process other than a real execution of a program code to reference data in a system (m) verifying that the restriction of type information of the program code is not violated so as to omit the type information process in the real execution of the program code, (n) virtually executing the program code from the beginning to the currently executed point corresponding to the currently executed point in the real execution of the program code and corresponding to the data position information to which the particular process references; and (o) restoring the data type information referenced at step (l).

14. The external storage area referencing and managing method as set forth in claim 13, wherein step (n) has the step of:

(p) caching data type information of at least one position of the program code before the real execution and after the completion of the virtual execution, and wherein step (o) has the step of:

(q) restoring desired data type information corresponding to data type information at a program position closest to the desired data position.

15. A storage medium from which a computer reads a program for virtually verifying a program code described as a program instruction set having instructions with data type restrictions so as to determine whether or not the restrictions are correctly satisfied, the program causing the computer to perform the steps of:

(a) designating a lower limit type permissible as type information for various data types as virtually verified results and un upper limit type corresponding to the use of the data so as to infer the range of the type of each data;

(b) merging data at a merged point of a plurality of paths due to a branch instruction in the program code and setting a common portion of the data as new data;

(c) reflecting the change of the data to the other data that is influenced by the change of the data when the data is changed at step (b);

(d) correlating original data and the data changed at step (b) so as to allow data to be reflected to be selected at step (c); and (e) prohibiting the program code from being really executed when a portion that violates the type restriction in the verified program code is detected at step (a).

16. The storage medium as set forth in claim 15, wherein step (b) is performed by (f) detecting a branch instruction in the program code and storing the branch source, the relation therewith, and the number of branches, the process at step (f) being performed before the program code is virtually verified, and wherein step (b) has the step of:

(g) referring branch number information obtained at step (f) and subtracting the branch source that has been merged from the branch number information so as to assure that the data restriction of the merging process of all branch sources is not violated.

17. The storage medium as set forth in claim 16, wherein step (b) has the step of:

(h) unifying data without generating new data when two data to be merged has the same data structure.

18. The storage medium as set forth in claim 15, wherein step (b) has the step of:

(h) unifying data without generating new data when two data to be merged has the same data structure.

19. A storage medium from which a computer reads a program using a system for virtually executing a program code before really executing the program code, the program causing the computer to perform the steps of:

(i) verifying only a data type restriction of the program code before really executing the program code;

(j) deciding the final use position of each data and storing it at step (i); and (k) unallocating a storage area for data that exceeds the data valid range corresponding to the data validity range information designated at step (j) during the real execution of the program code.

20. A storage medium from which a computer reads a program for allowing a particular process other than a real execution of a program code to reference data in a system for verifying that the restriction of type information of the program code is not violated so as to omit the type information process in the real execution of the program code, the program causing the computer to perform the steps of:

(l) virtually executing the program code from the beginning to the currently executed point corresponding to the currently executed point in the real execution of the program code and corresponding to the data position information to which the particular process references; and (m) restoring the data type information referenced at step (l).

21. The storage medium as set forth in claim 20, wherein step (l) has the step of:

(n) caching data type information of at least one position of the program code before the real execution and after the completion of the virtual execution, and wherein step (m) has the step of:

(o) restoring desired data type information corresponding to data type information at a program position closest to the desired data position.

* * * * *